June 23, 1936.  G. F. DALY  2,045,437
MULTIPLYING MACHINE
Filed Nov. 21, 1932  17 Sheets-Sheet 1

George F. Daly
INVENTOR

BY Cooper, Kerr + Dunham
ATTORNEYS

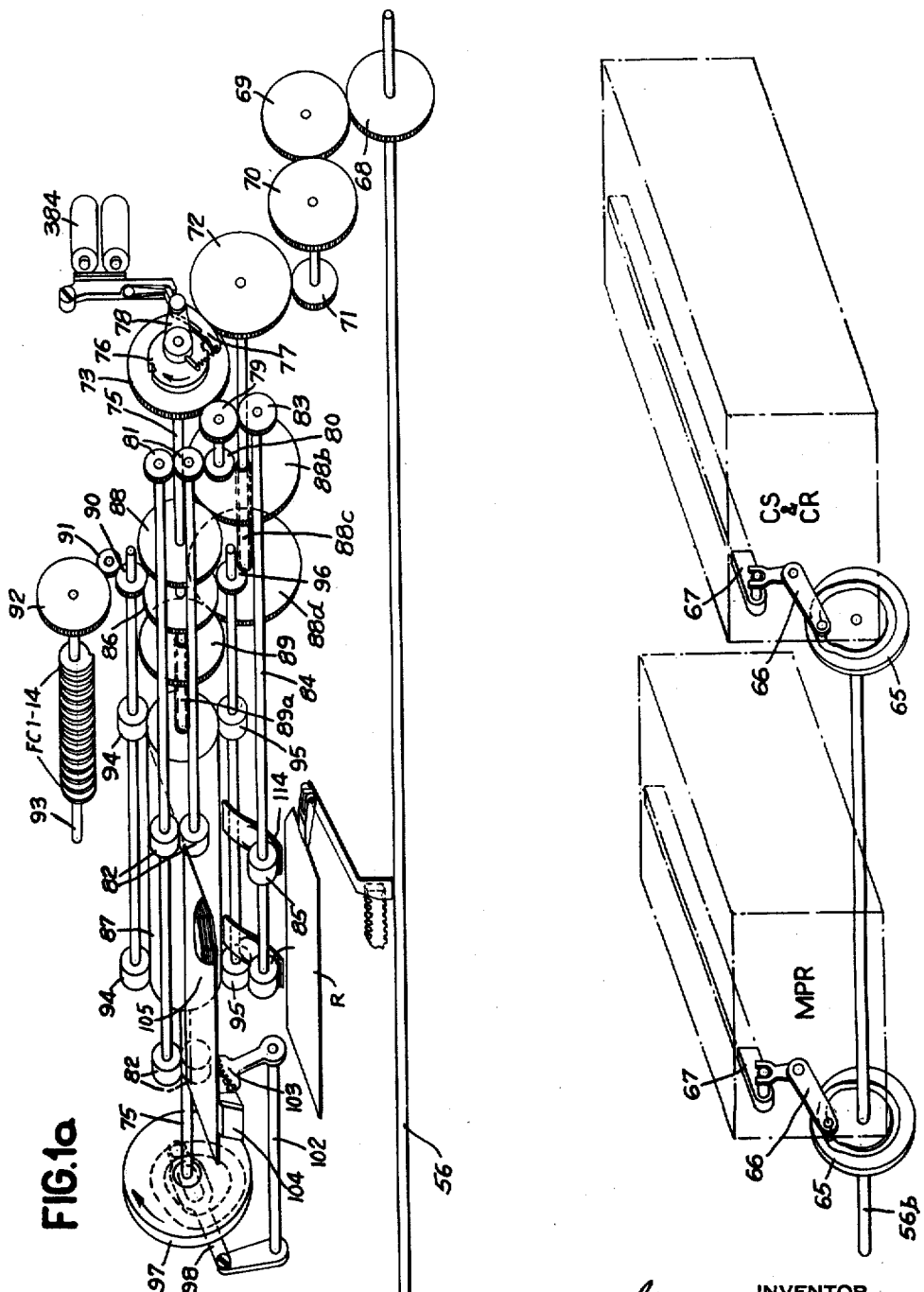

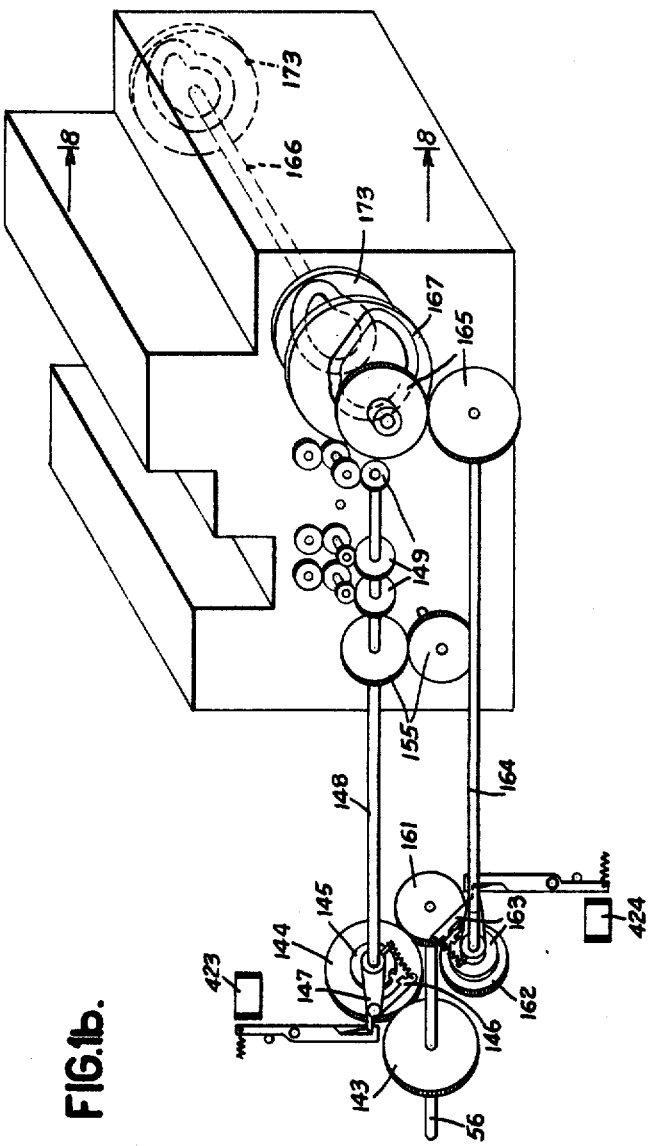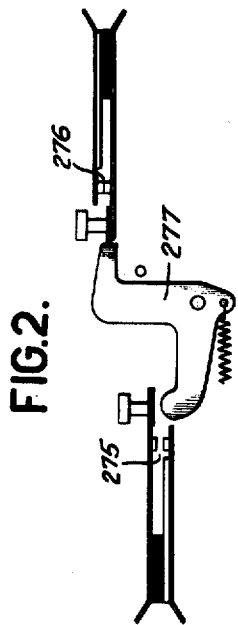

June 23, 1936.　　　G. F. DALY　　　2,045,437
MULTIPLYING MACHINE
Filed Nov. 21, 1932　　　17 Sheets-Sheet 4

George F. Daly
INVENTOR

BY Cooper, Kerr & Dunham
ATTORNEYS

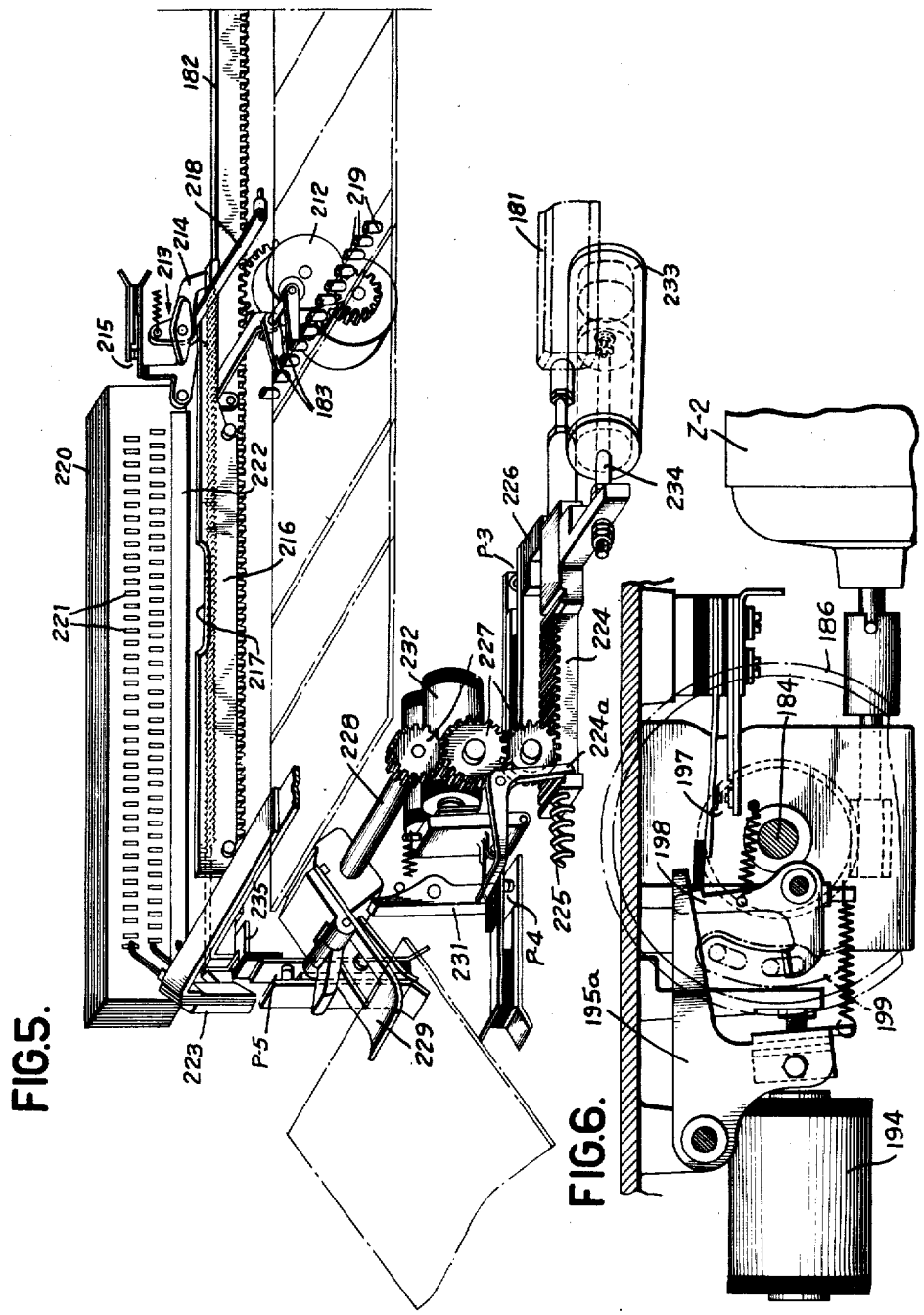

June 23, 1936.   G. F. DALY   2,045,437
MULTIPLYING MACHINE
Filed Nov. 21, 1932   17 Sheets-Sheet 6
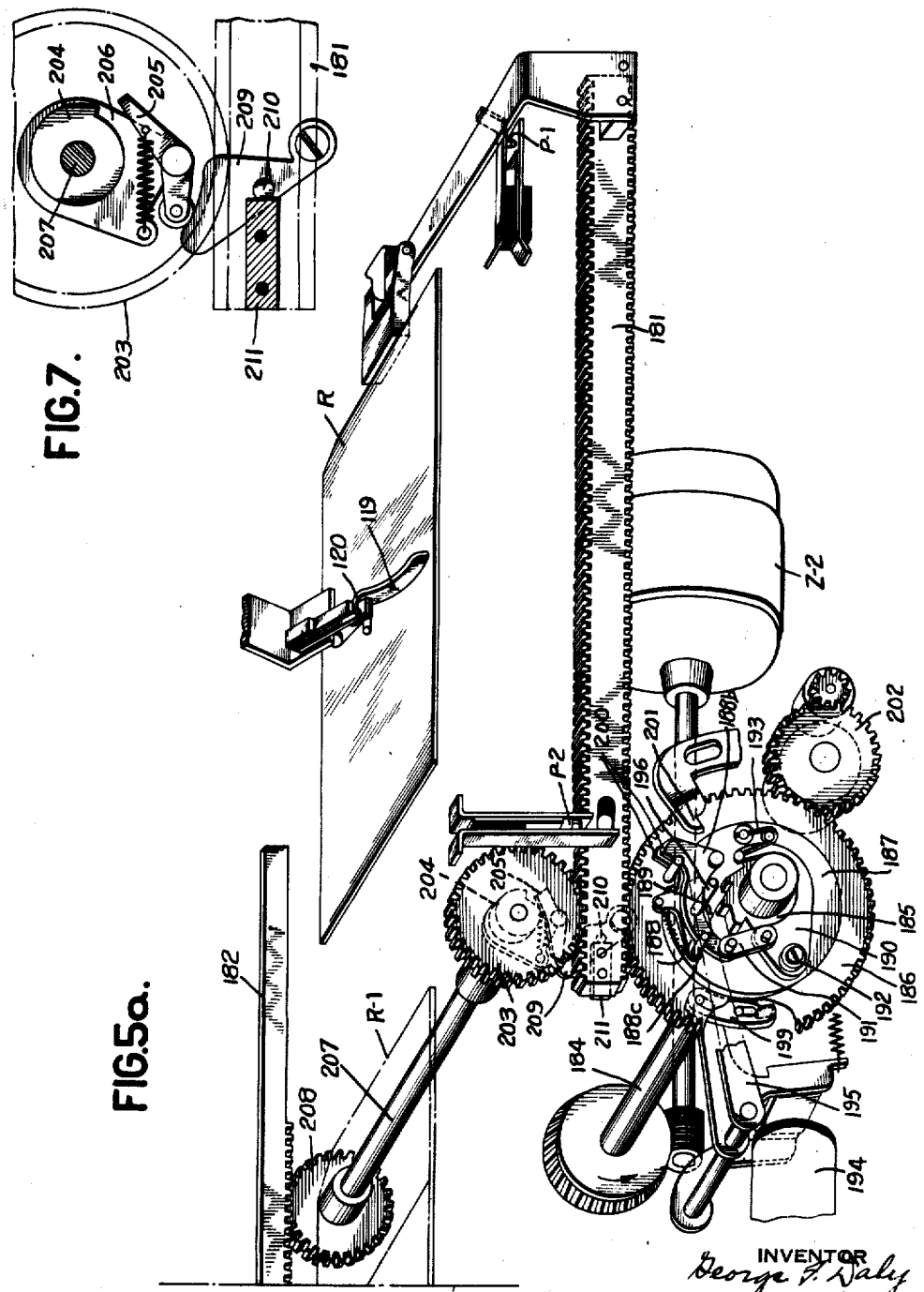

June 23, 1936.　　　　G. F. DALY　　　　2,045,437
MULTIPLYING MACHINE
Filed Nov. 21, 1932　　17 Sheets-Sheet 7
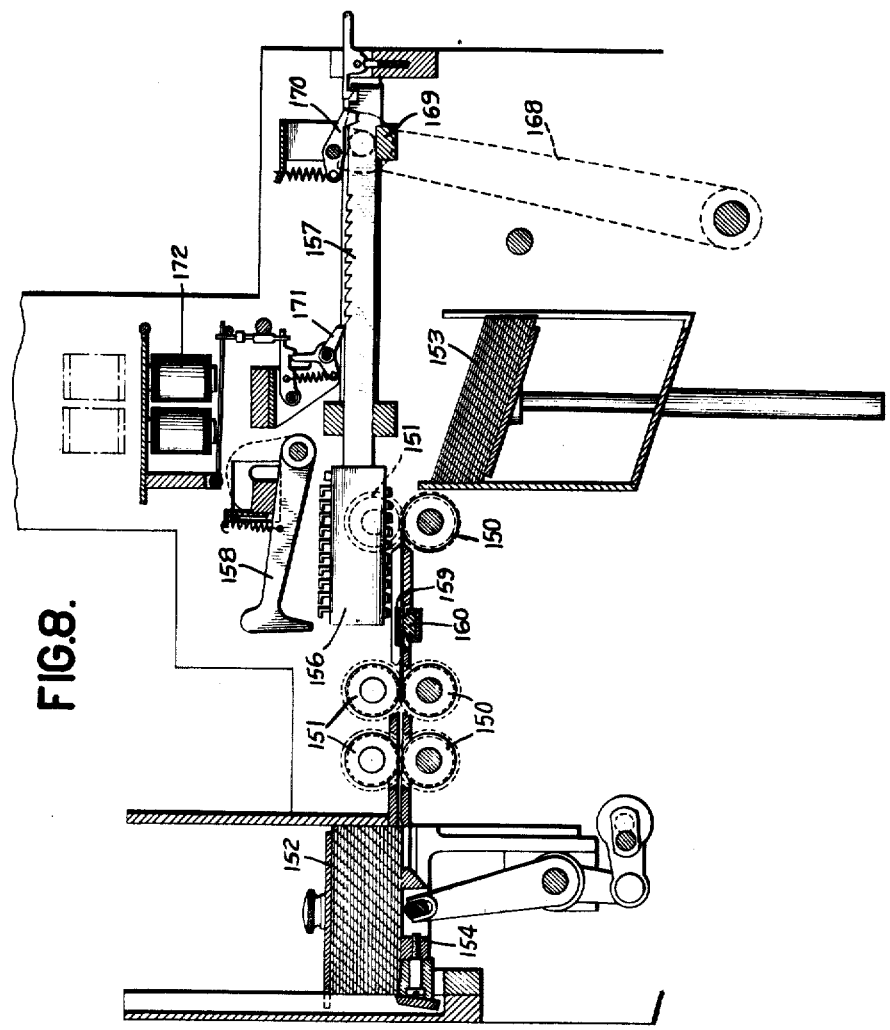
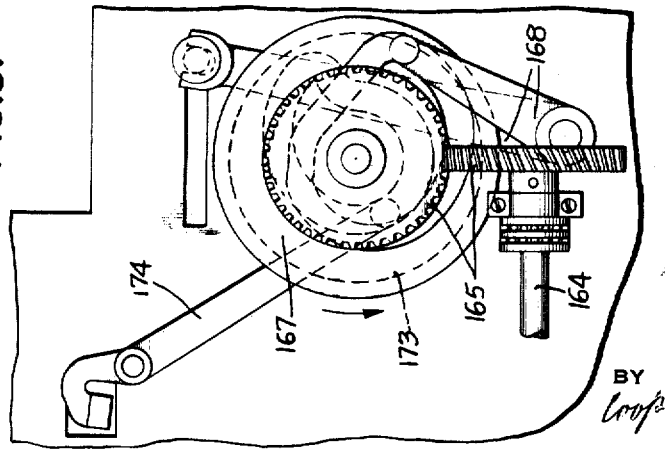
George F. Daly
INVENTOR
BY Cooper, Kerr & Dunham
ATTORNEYS June 23, 1936.   G. F. DALY   2,045,437
MULTIPLYING MACHINE
Filed Nov. 21, 1932   17 Sheets—Sheet 8

INVENTOR
George F. Daly
BY
Cooper, Kerr & Dunham
ATTORNEYS

June 23, 1936. G. F. DALY 2,045,437
MULTIPLYING MACHINE
Filed Nov. 21, 1932 17 Sheets-Sheet 9
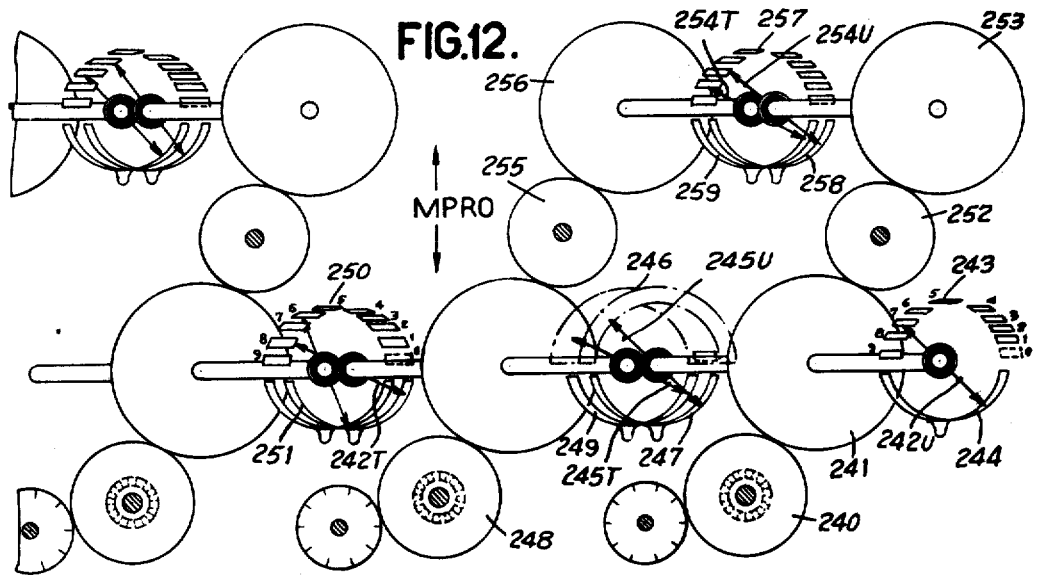
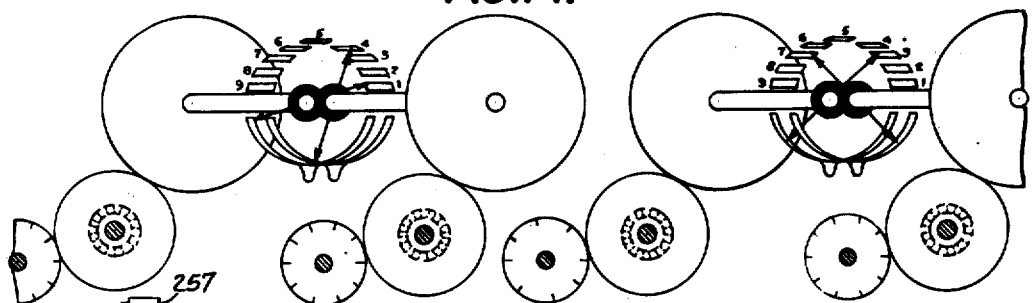
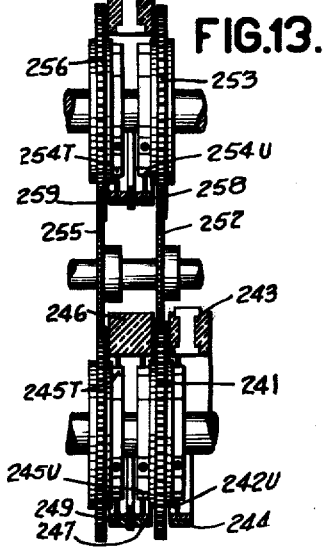
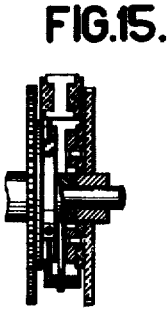
George F. Daly
INVENTOR
BY Cooper, Kerr & Dunham
ATTORNEYS June 23, 1936.  G. F. DALY  2,045,437
MULTIPLYING MACHINE
Filed Nov. 21, 1932   17 Sheets-Sheet 10
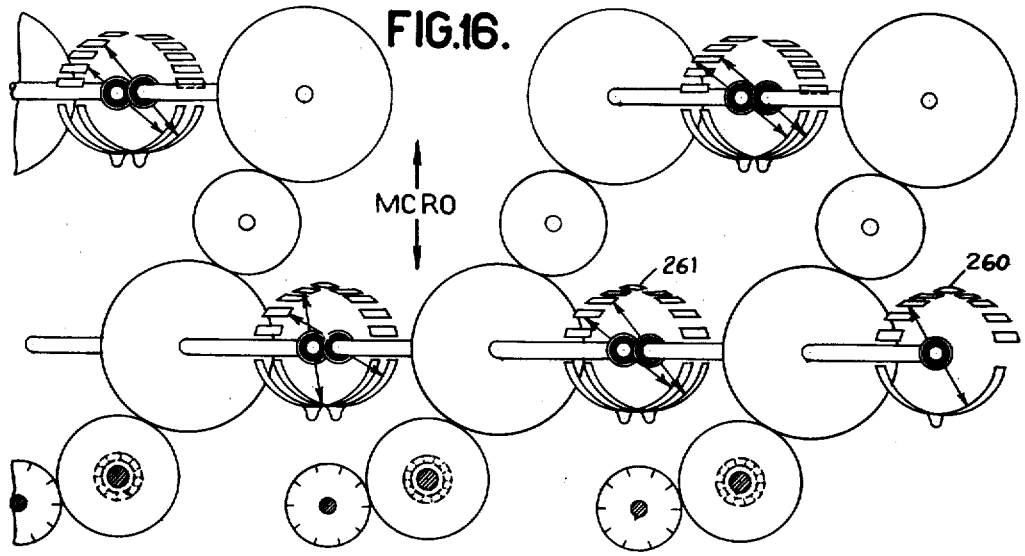
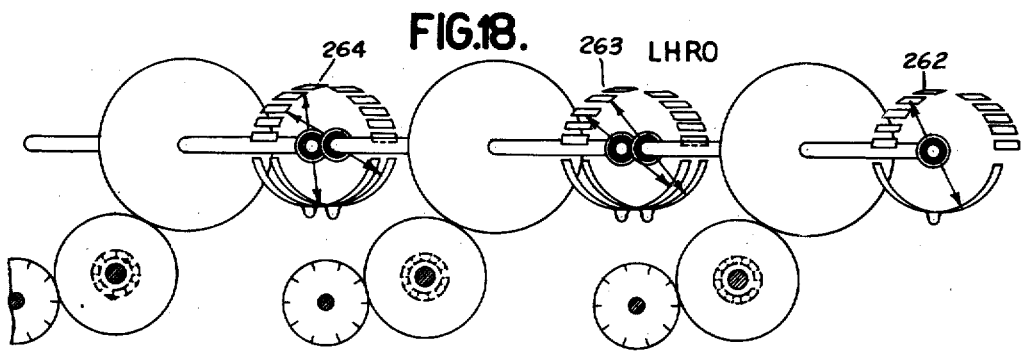
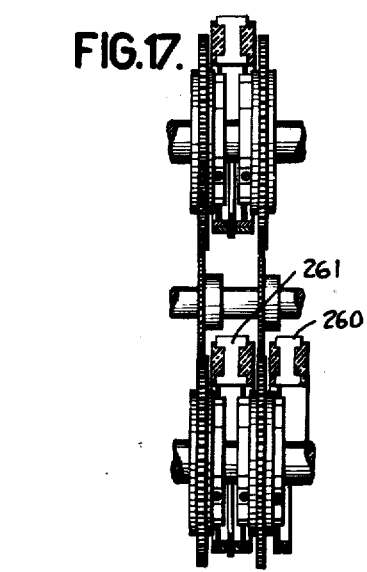
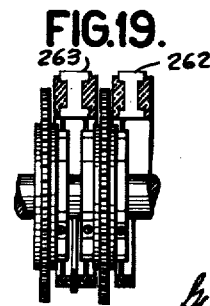
George F. Daly
INVENTOR
BY Cooper, Kerr & Dunham
ATTORNEYS June 23, 1936. G. F. DALY 2,045,437
MULTIPLYING MACHINE
Filed Nov. 21, 1932 17 Sheets-Sheet 11

INVENTOR
George F. Daly
BY
Cooper, Kerr & Dunham
ATTORNEYS

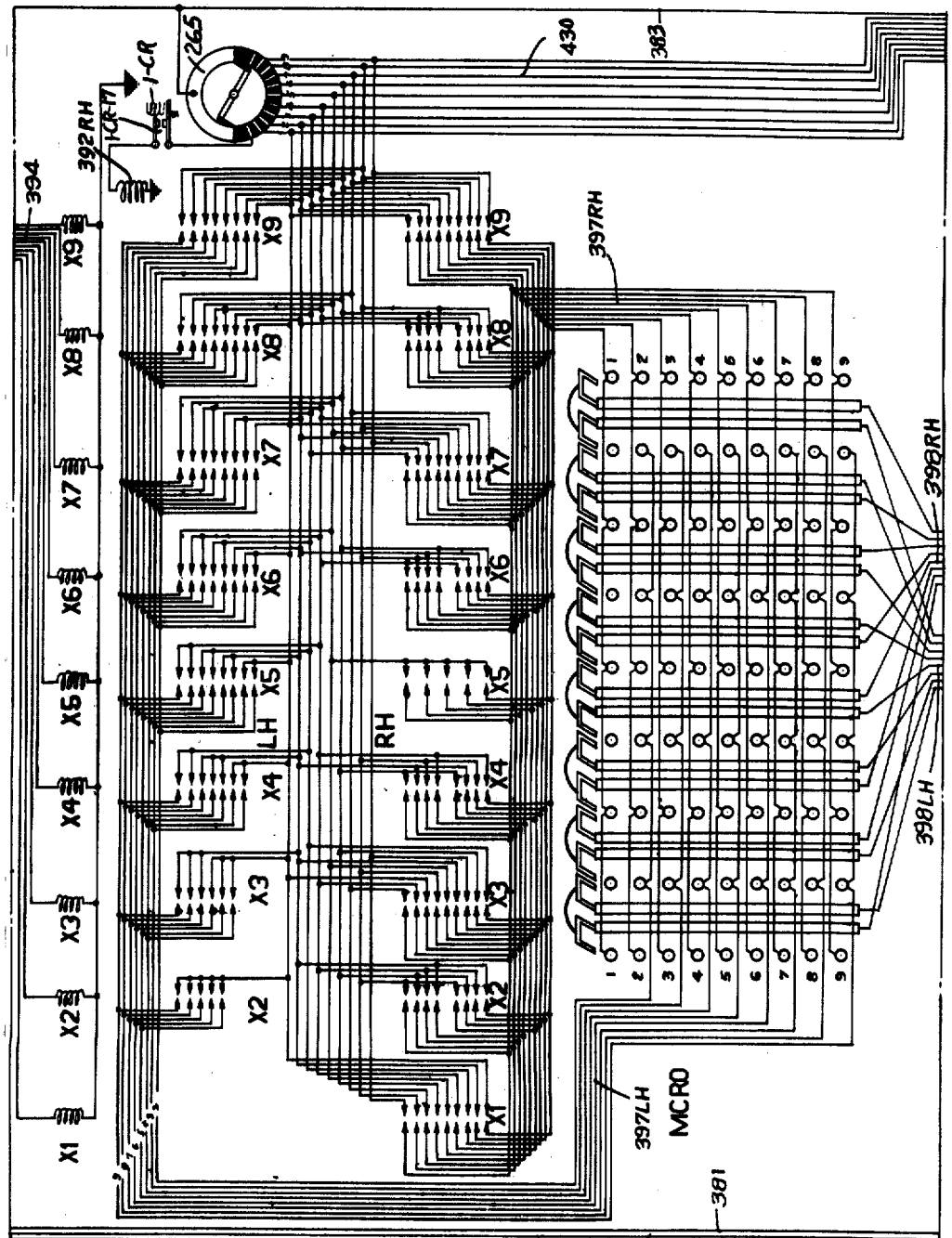

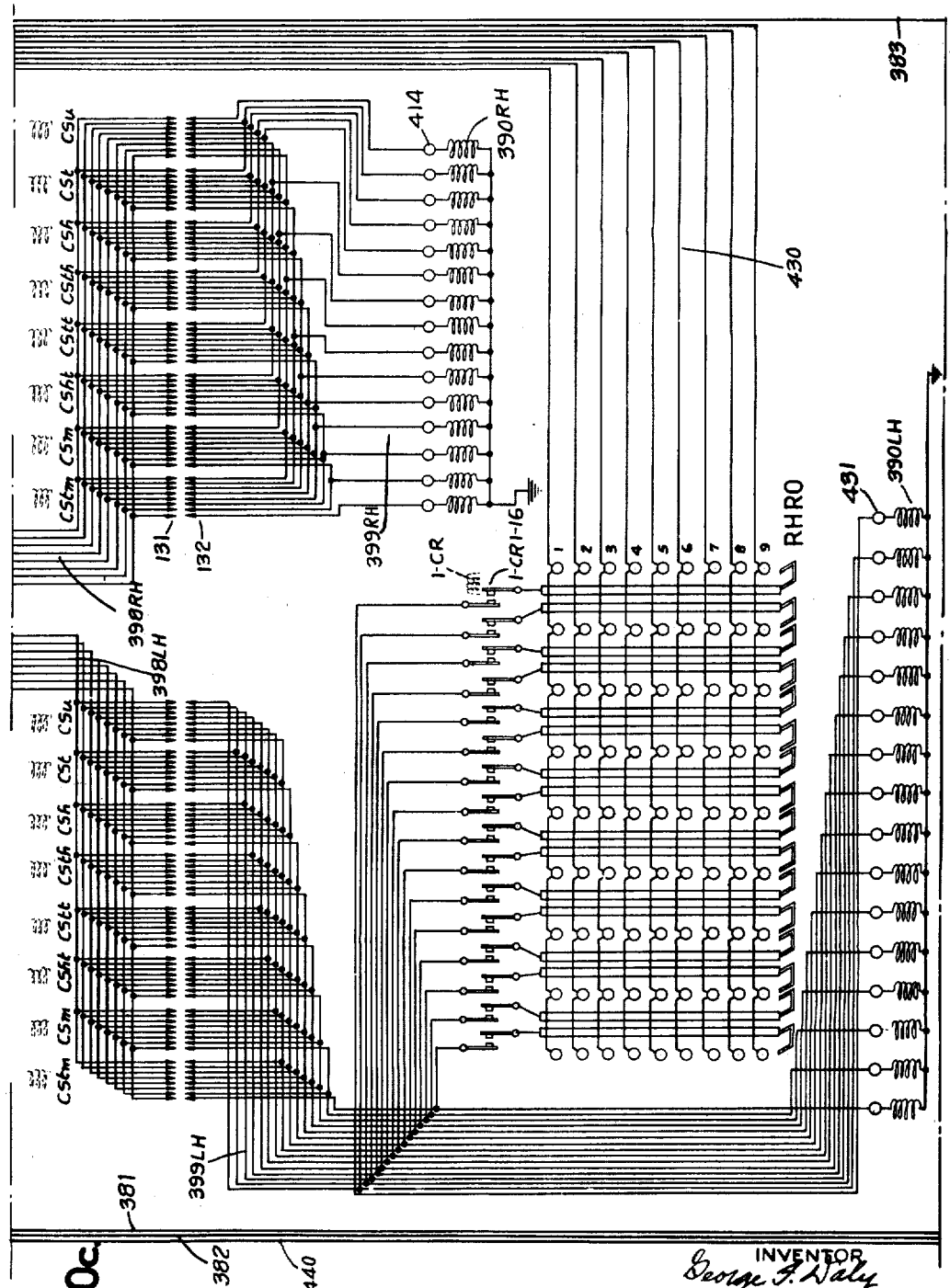

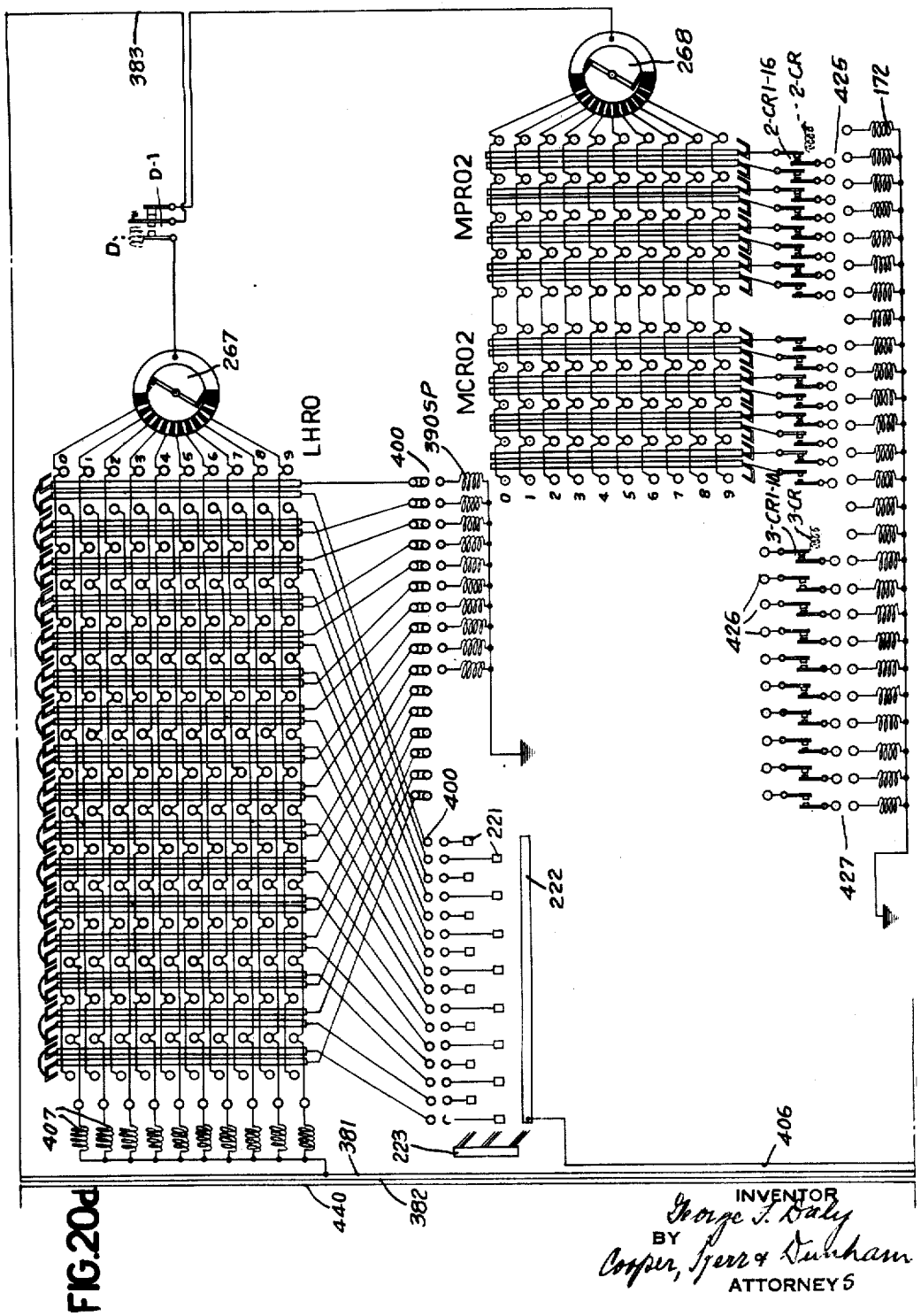

June 23, 1936.   G. F. DALY   2,045,437
MULTIPLYING MACHINE
Filed Nov. 21, 1932   17 Sheets-Sheet 15
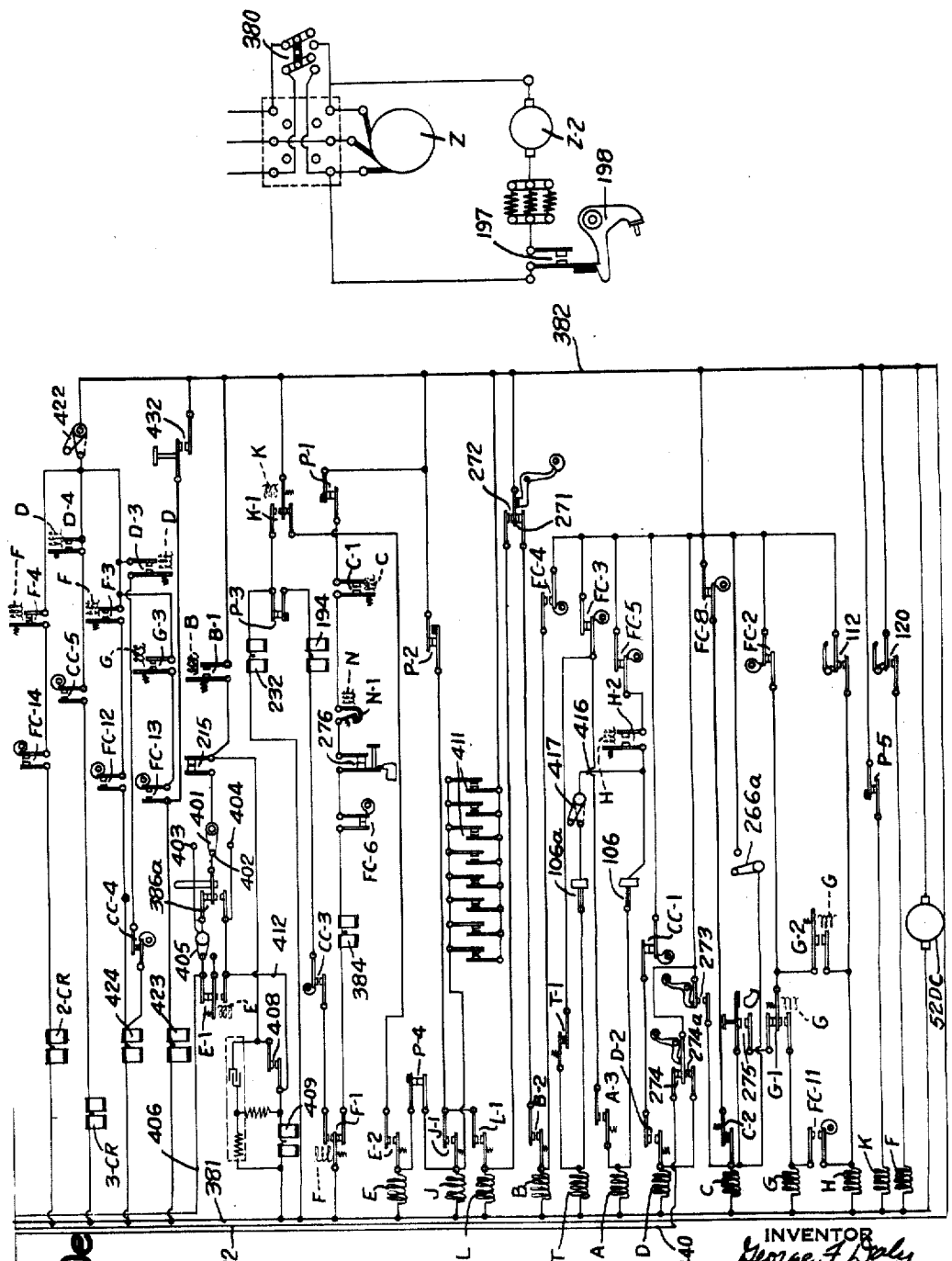

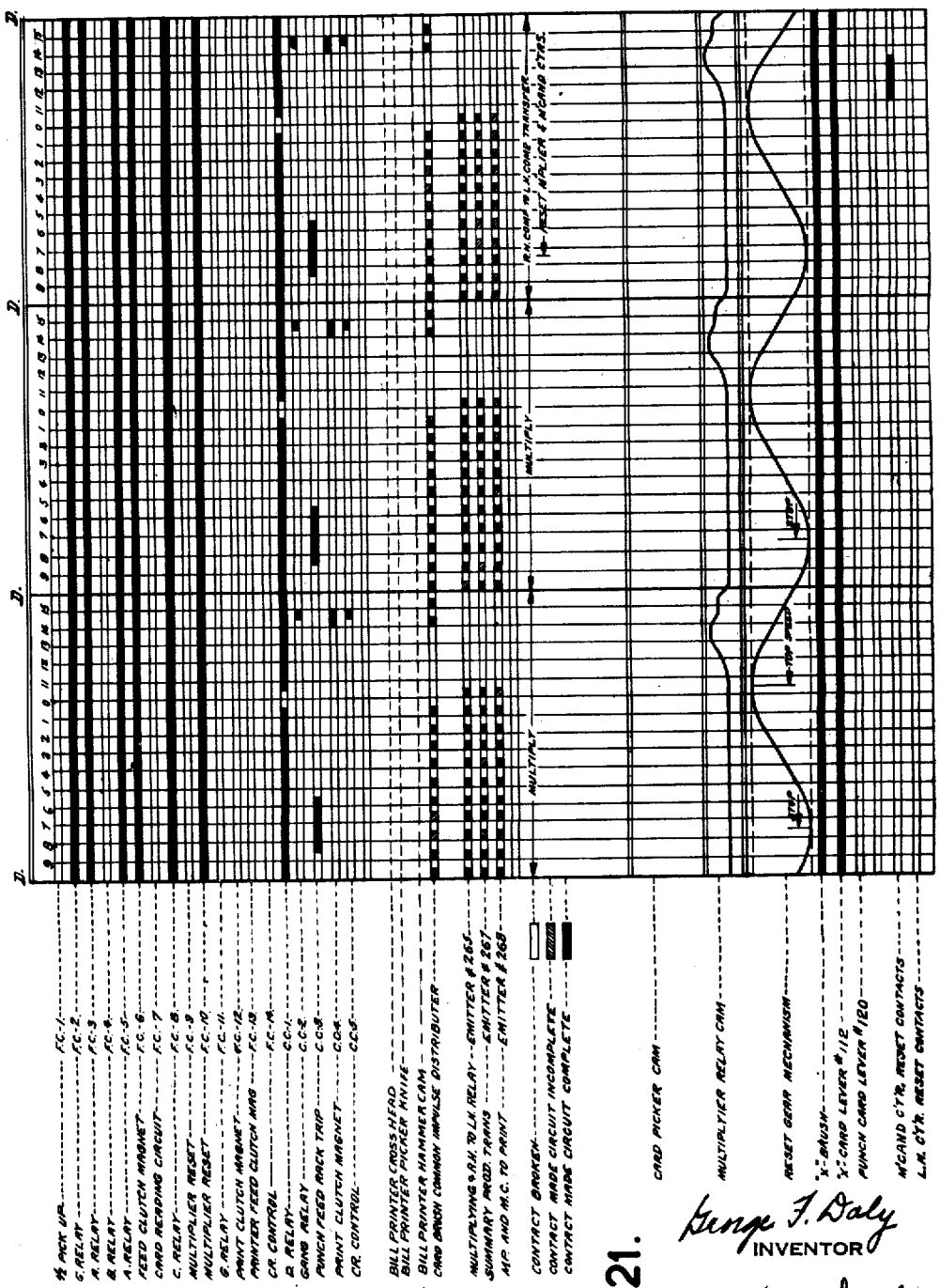

June 23, 1936.　　G. F. DALY　　2,045,437
MULTIPLYING MACHINE
Filed Nov. 21, 1932　　17 Sheets-Sheet 17

Patented June 23, 1936

2,045,437

UNITED STATES PATENT OFFICE 2,045,437

MULTIPLYING MACHINE

George F. Daly, Johnson City, N. Y., assignor, by mesne assignments, to International Business Machines Corporation, New York, N. Y., a corporation of New York Application November 21, 1932, Serial No. 643,663

16 Claims. (Cl. 235—92)

This invention relates to improvements in multiplying machines and more particularly relates to improvements in the record controlled and record making multiplying machines which are shown and described in the copending application of J. W. Bryce, George F. Daly and James M. Cunningham, Serial No. 576,184, filed November 19, 1931 and in the application of James M. Cunningham, Serial No. 606,585, filed April 21, 1932.

One object of the present invention resides in the provision of an improved drive for the card handling and sensing section of a record controlled multiplying machine for the purpose of providing a creeping action of the card transfer and contact roll relatively to the point of pick up of successive cooperating cards so that localized wear and possible pitting at the index point positions of the card transfer and contact roll will be minimized.

A further object of the present invention resides in the improvement of the previous machines to the general end that further selective controls may be provided to permit or suppress product punching under various kinds of machine operation. With previous machines provision was made for suppressing punching upon checking operations with reversed multipliers and multiplicands. According to the present invention check runs may be made with the punching of products suppressed as before or if desired check runs can be made with product punching. A further object of the present invention resides in the provision of selective control means to permit or suppress product punching upon normal multiplying operations and/or upon rate card operations.

A further object of the present invention resides in the provision of improved controls for the machine including an improved and simplified control for setting up the cycle controller, an improved control for initiating new multiplying operations and for preventing the possibility of double multiplications upon short calculations, and an improved control for reinitiating new computing operations and for setting up the cycle controller in which such operations are controlled by the reset of the accumulator in which the final product is received.

A further object of the present invention resides in the provision of an improved reset initiating circuit for the final products accumulator (LH accumulator) with improved intercontrols with the punching mechanism to prevent too early resetting operations and to ensure that reset will ultimately be effected.

A further object of the present invention resides in the provision of improved means for setting up the product to the nearest one half.

A further object of the present invention resides in the provision of an improved and simplified arrangement of the stop and start key circuits of the machine.

A further object of the present invention resides in the provision of a multiplying machine with a bill printer for printing bills with the amounts computed by the multiplying machine.

A further object of the present invention resides in the provision of a record controlled multiplying machine with improved means for selecting under record control which of a plurality of factors are to be entered into the machine and utilized in a multiplying computation which are to be performed by the machine.

A further object of the present invention resides in the provision of a multiplying machine with improved selecting means for association with the multiplier entry receiving device and/or the multiplicand entry receiving device so that one of several multipliers or one of several multiplicands can be read from a record under record card control and utilized in the multiplying computation which is performed by the machine.

A further object of the present invention resides in the provision of improved constructions for the simplification of the machine in several respects. Among these simplified features may be mentioned the provision of a single emitter used for a dual purpose, viz. to supply impulses to the multiplying relays and impulses for RH and LH transfer in lieu of using separate emitters as heretofore. Further simplification resides in the provision of multi-contact relays of conventional type in lieu of the special relay contacts heretofore used in certain counters of multiplying machines.

A further object of the present invention resides in the provision of an improved control circuit for the card feed clutch magnet to provide a better timing control for the card feed clutch magnet.

A further object of the present invention resides in the improvement of the card eject mechanism of the punch to make the ejecting actions more gentle and less violent by the provision of a dash pot to control the eject mechanism.

A further object of the present invention resides in the provision of improved controls associated with the punching mechanism of the machine. In lieu of utilizing a multiplicity of contacts directly actuated by the punch parts as heretofore, such multiplicity of contacts at various points in the punch and directly actuated by punch parts have been eliminated and a single contact substituted therefor, which single contact in turn controls a single relay provided with multiple contact points for the various subordinate controls. By this construction excessive contact pressures from a multiplicity of contacts which might affect the operation of the punch are obviated.

A further object of the present invention resides in the provision of an improved arrangement of circuits and controls to enable the machine to be used for simple adding purposes and to add directly amounts derived from the records.

A further object of the present invention resides in the provision of improved means for setting up the cycle controller and improved means for breaking down the setup of the cycle controller.

A further object of the present invention resides in the provision of an improved means for controlling the initiation of reset of the multiplicand and multiplier counters of the machine and improved means controlled by the reset of the multiplicand counter for initiating a new card feed and a break down of the setup of the cycle controller.

Further and other objects of the present invention will be hereinafter set forth in the accompanying specification and claims and shown in the drawings, which by way of illustration show what I now consider to be preferred embodiments of the invention.

In the drawings:

Figures 1, 1a and 1b, taken together, show a somewhat diagrammatic view of the various units of the machine and also the driving mechanism for the various units;

Fig. 2 is a detail view showing certain latching mechanism which is used on the start and stop keys of the machine;

Fig. 3 is a sectional detail view of certain of the gearing parts which are used for driving the card transfer and contact roll, and providing a creeping action for the pick up of cards. The gearing which is shown in section in this view is shown in isometric relation in Fig. 1a.

Figure 10:
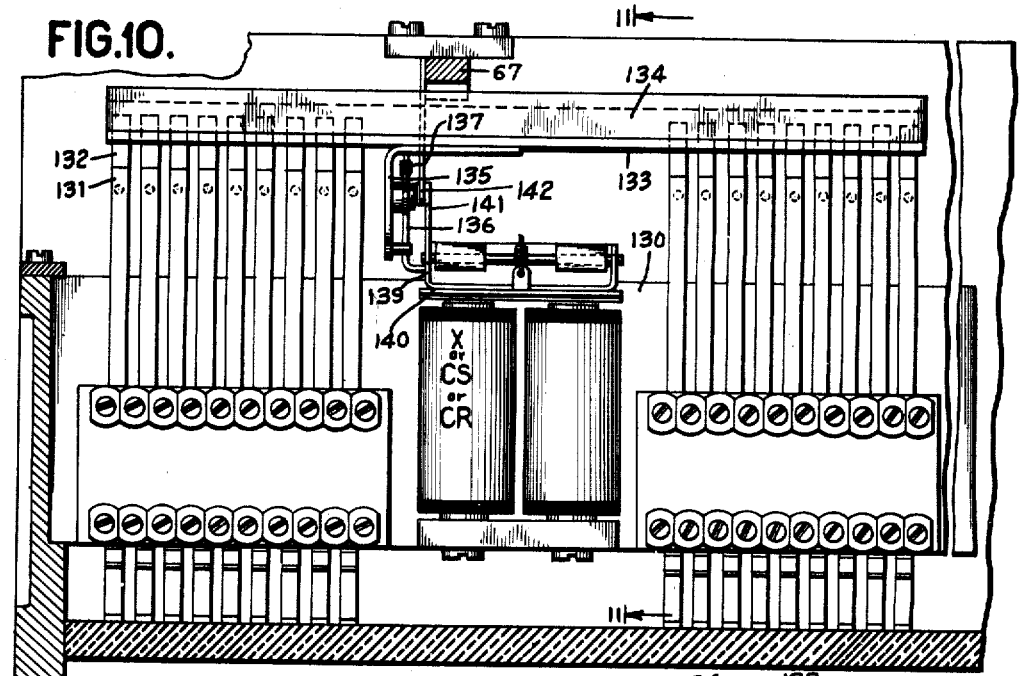
Figure 11:
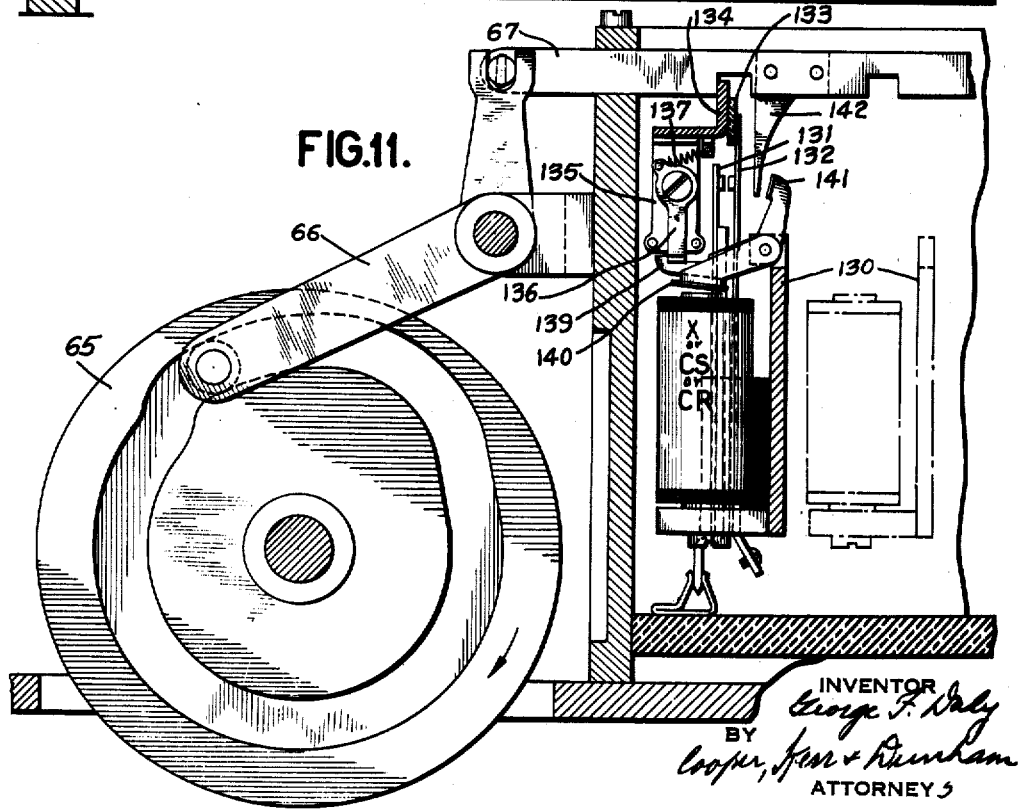
Figure 20A:
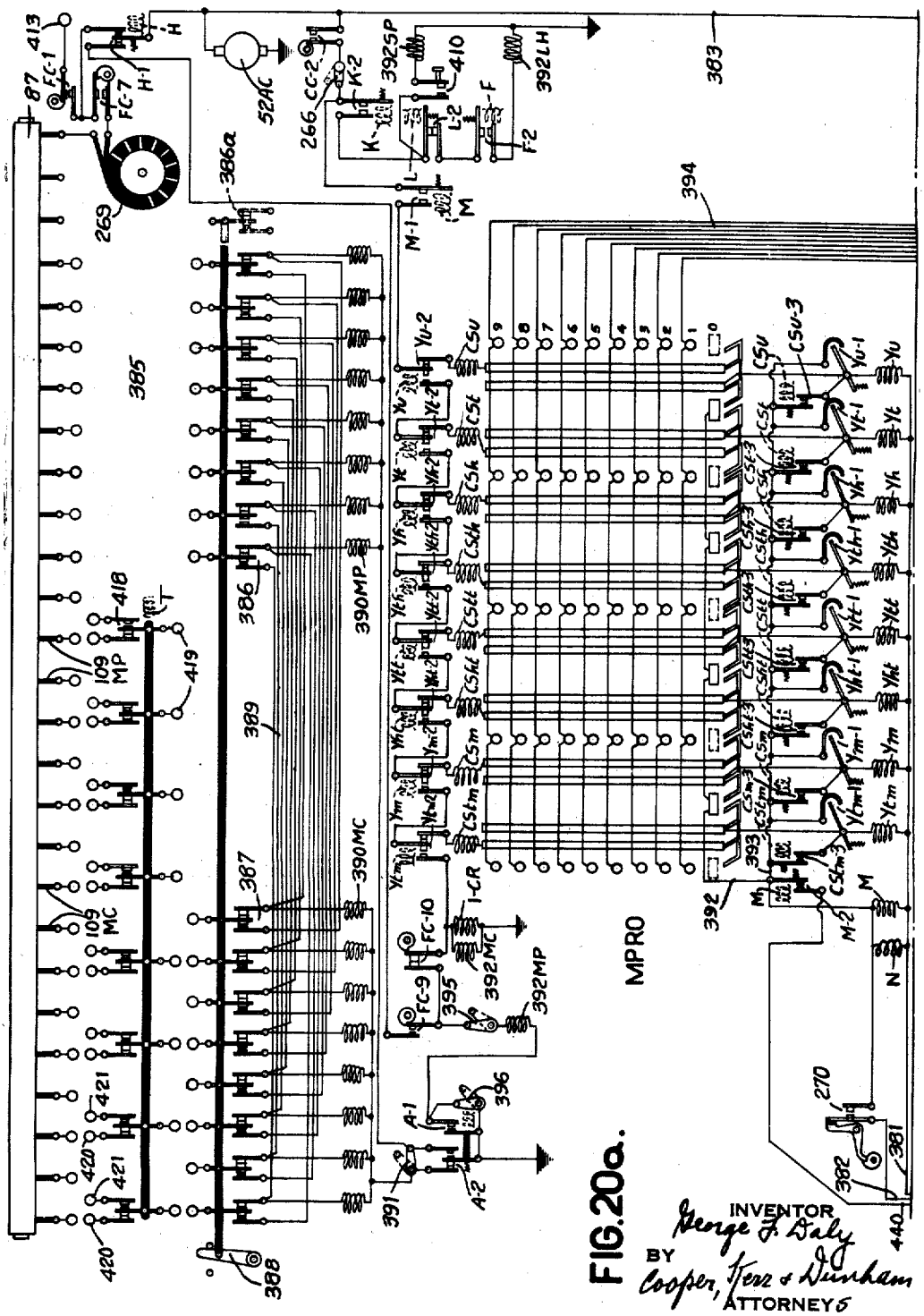
Figure 21A:
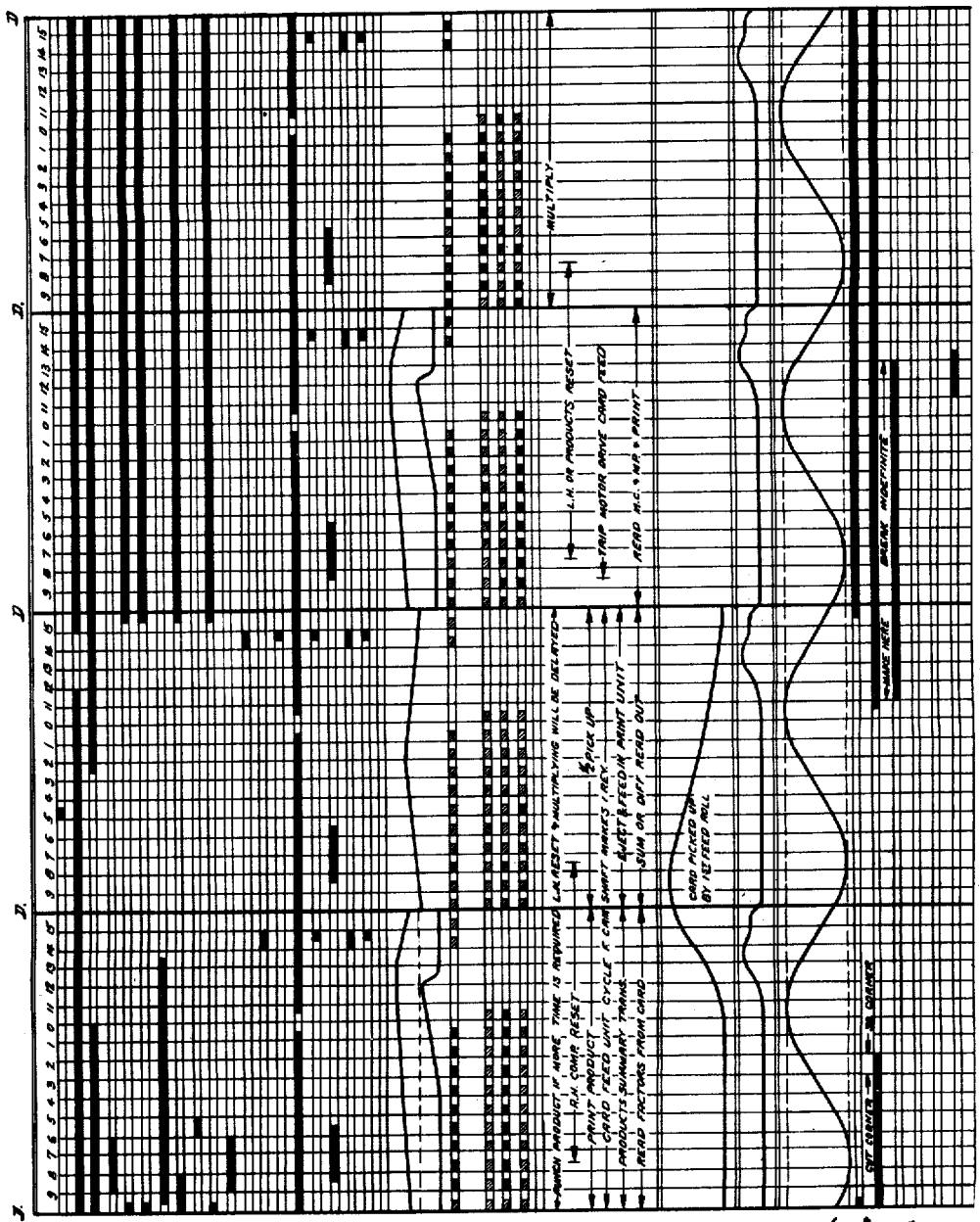

Figs. 5 and 5a taken together, show a somewhat diagrammatic view of the punching section of the machine;

Fig. 6 is a sectional detail of certain parts in the punching section of the machine;

Fig. 7 is another detail of parts in the punch;

Fig. 8 is a transverse central sectional view of the bill printing unit of the machine, the outside view of which is shown on Fig. 1b. Fig. 8 is substantially a sectional view taken on lines 8—8 of Fig. 1b, looking in the direction of the arrows;

Fig. 9 is a side elevational view of certain of the cam devices used on the bill printing section of the machine and shows the driving shaft and certain cam follower parts;

Fig. 10 is a side elevational view of one of the multi-contact electromagnetic relay devices which are used in the machine;

Fig. 11 is a detail sectional positional view, the section being taken substantially on lines 11—11 of Fig. 10;

Fig. 12 is a somewhat diagrammatic view of the readout device for the MP counter, which readout device is of dual form;

Fig. 13 is a fragmentary sectional view, showing the construction of this MPRO readout device;

Fig. 14 is a diagrammatic view of the readout device for the RH accumulator;

Fig. 15 is a fragmentary sectional view showing the construction of this RHRO readout device;

Figs. 16 and 17 are respectively diagrammatic and sectional views of the multiplicand readout device. This readout device is also of dual form;

Figs. 18 and 19 are respectively diagrammatic and sectional views of the readout device for the LH accumulator;

Figs. 20a, 20b, 20c, 20d and 20e, taken together and arranged vertically in the order named, show the complete circuit diagram of the machine; and Figs. 21 and 21a taken together show the timing diagram of the machine.

A general description will first be given of the various units and their location in the machine. The machine embodies a card feed and card handling section, which is shown on Fig. 1a and also in cross-section on Fig. 4. This part of the machine is arranged to feed cards and derive readings therefrom and afterwards pass each card into the punching section of the machine, which punch is a punch of the successive column punching type A small portion of the punching mechanism only is shown in Fig. 1a, and the rest of the punching mechanism is shown more completely in Figs. 5 and 5a.

The counters and receiving devices of the machine are as follows. In the upper part of the machine there is shown the RH accumulator, LH accumulator and the summary products accumulator respectively designated RH, LH and SP. In the lower part of the machine there are two counters which are used as multiplier and multiplicand entry receiving devices, which are respectively designated MP and MC on Fig. 1.

The machine also includes a multiplying panel relay unit which is in the lower part of the machine (Fig. 1a) and generally designated MPR. Also in the lower part of the machine there is another multi-contact relay unit for column shifting and control purposes, which is generally designated CS and CR.

The machine also includes a bill printing unit which is shown on Fig. 1b. Such bill printing unit may be omitted if desired.

The machine also includes a number of emitter mechanisms, cam contact devices, impulse distributors, etc.

Machine drive

The machine is adapted to be driven by a constantly running motor Z (Fig. 1), which motor through a belt and pulley and ratchet drive, drives a shaft 51, which in turn drives an A. C. and D. C. generator 52.

Shaft 51, through worm gear drive 53 drives a vertical shaft 54 for driving the units of the upper and lower sections of the machine. At its upper end shaft 54 through worm gear 55 drives the main drive shaft 56. The various accumulators are driven from this shaft in the customary manner and such shaft 56 also serves to drive the bill printing unit when such unit is employed. The reset drive for the upper accumulator units is provided as follows. Shaft 56 carries a spur gear 57, driving a gear 58 with a four to one drive ratio. Gear 58 has extending from it four Geneva pins 59 cooperating with the other or cross element of the Geneva, designated 60. Secured to 60 is an internal gear 61 meshed with the spur gear 62 mounted on the end of the reset shaft 63.

The accumulators are reset from this reset shaft in the customary manner by electromagnetically controlled one revolution clutches.

The drive for the lower units of the machine is substantially the same as previously described, i. e. the shaft 54, through worm gearing 55b, drives the lower drive shaft 56b, which shaft is also used for actuating parts in the MPR, CS and CR units. A similar Geneva drive 57b, 58b, 59b and 60b is adapted to drive an internal gear 61b, which in turn drives a pinion 62b, mounted on the end of the lower reset shaft 63b. The lower reset shaft 63b is adapted to reset the MP and MC entry devices by means of the usual electromagnetic one revolution clutches.

*Card feed and card handling unit drive*

Figure 3:
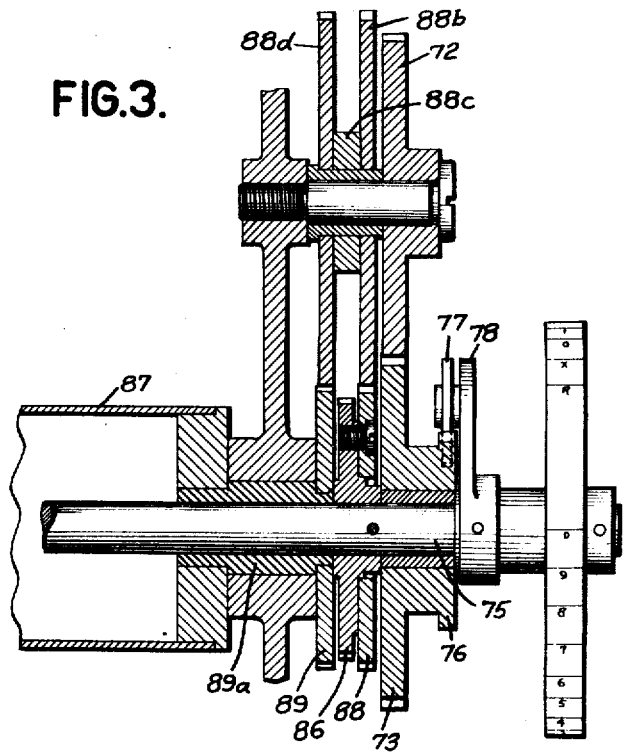
Figure 4:
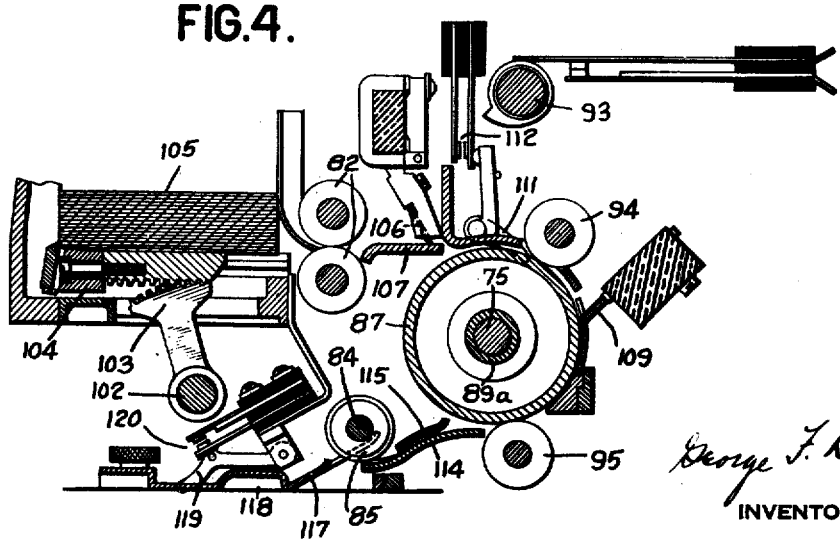
Fig. 4 is a vertical sectional view, taken through the card handling and reading section of the machine.

Referring to Figs. 1a, 3 and 4, the shaft 56 is provided with a gear 68, which through an idler gear 69 drives a gear 70, which through its shaft drives gear 71, which gear 71 in turn drives gear 72. Gear 72 in turn drives a gear 73 revolubly mounted on shaft 75. Gear 73 has fixed to it one element 76 of the one revolution clutch, the complemental part of which comprises a pawl 77, carried by an arm 78, which is fixed to shaft 75. The one revolution clutch is of the customary electromagnetic type used in the tabulating machines and with this one revolution clutch engaged by the energization of its clutch magnet, the shaft 75 will rotate in unison with gear 73, and with the one revolution clutch disengaged, 73 will continue its rotation and shaft 75 will remain stationary.

Gear 73 also drives an intermediate gear 79, which is fixed to the gear 80, which drives a train of gears 81 and which in turn drive the card feed rolls 82 of the machine. Such card feed rolls 82 are constantly rotating feed rolls the same rotating at all times when gear 73 is rotating and when the main counter drive shaft is rotating. Also in train with gear 79 is a gear 83, which gear constantly drives a drag roll shaft 84, having fixed thereon a pair of drag rolls 85.

According to the present machine, provision is made for providing a slight creep of the point of pick up of the card transfer and contact cylinder 87 upon successive cards, so that the sensing points on this contact cylinder shifts slightly from card to card. In this way an improved sensing action is secured and the cylinder is prevented from being pitted at the index points by the action of the brushes. In lieu of driving the card transfer contact cylinder directly from the shaft 75 as heretofore, a different driving arrangement is provided. As shown, the one revolution element clutch 76 is provided with two notches and the arrangement of this clutch is such that whenever the pawl 77 is engaged, the element 78 of the one revolution clutch will make one complete revolution. The one revolution clutch pawl 77 can be engaged in either of the two notches of the clutch element 76, which relation of the clutch members is provided because after the machine has been started and is running on a run of cards one counter cycle is required to traverse the card and carry it past the sensing brushes and another cycle is required to deliver the card to the punching section of the machine.

To provide for a creep of the point of pick up of the card transfer and contact cylinder 87, the following drive is provided. Fixed to shaft 75 is a gear 88, which in turn drives a gear 88b mounted on the sleeve 88c, which in turn drives a gear 88d. Gear 88d in turn drives gear 89, which is fixed to the sleeve 89a revolubly mounted on shaft 75 but fixed to the card transfer and contact cylinder 87. By referring to Fig. 3, it will be noted that gears 88 and 89 have a slightly different diameter, and gears 88b and 88d also have a slightly different diameter. This slight difference in diameter provides for the slight creeping advance of card transfer and contact cylinder 87, as the card handling operations ensue and serves to prevent sensing occurring at the same spot or spots on successive card cycles.

*Drive to intermittently actuated contacts*

Gear 86 is fixed to shaft 75 and drives a gear 90, which gear in turn drives an idler gear 91 driving a gear 92 fixed to cam contact shaft 93. Shaft 93 has secured upon it a number of cams for actuating the FC group of cam contact devices of the machine. Such cams are so driven that they make one revolution per card feed cycle in contradistinction to a cycle. Fixed to the shaft of gear 90 are card feed rolls 94, which are spring pressed into contact with card transfer and card contact cylinder 87. Similar spring pressed card feed rolls 95 also cooperate with the transfer and contact roll 87 and such rolls are driven by the gear 96 in train with gear 86. Rolls 94 and 95 are preferably made of insulating material.

*Card picker drive*

Shaft 75 has secured to it a box cam 97 with which a follower 98 cooperates. The follower rocks a rock shaft 102 carrying a gear sector 103, which is in engagement with a picker block 104. Upon engagement of the one revolution clutch the picker is called into action to withdraw a single card from the magazine 105 (Fig. 4) and advance this card into the bite of rolls 82. These rolls in turn forward the card to the card transfer and contact roll 87. Intermediate rolls 82 and the transfer cylinder 87 there is provided an advance or X brush sensing position. According to one feature of the present invention, several such X brushes may be provided at such position. The multiplicity of brushes does not show in Fig. 4, since the brushes are in alignment, one being back of the other. One X brush as shown at 106 cooperates with the combined contact and card guide plate 107. A curved card guide is provided around the transfer cylinder and the advancing card is carried around by the forward rotation of the transfer cylinder and by the rotation of rolls 94 to traverse the main card sensing brushes generally designated 109 in Fig. 4. Also in cooperation with the card is a pivoted card lever 111 adapted to operate the usual card lever contacts 112.

After the card has been sensed by the main sensing brushes 109, it is advanced between guiding members 114 and 115 by the cooperation of feed rolls 95 with cylinder 87. While between these members it is advanced by drag rolls 85, which extend downwardly into recesses of the lower members 114, as shown in Fig. 1a. This arrangement provides for the feeding of the card and the advance of the card after it has been released by the rolls 95 so that the card may be delivered into the tray of the punching section of the machine. The drag rolls 85 deliver the card under the guiding member 117 and after the card has been freed from the drag rolls the card is flipped down into the tray of the punching section of the machine. The location of this tray is generally designated at 118 in Fig. 4, and the position of the card in this tray is indicated at R in Fig. 1a. A card lever 119 (Fig. 4) is also provided and adjacent the tray for closing card lever contacts 120 when the card is lodged in the tray of the punching section of the machine.

With the traverse of the card past the main sensing brushes 109, the amount of the multiplier and multiplicand will have been read from the card and entered into the MP and MC receiving devices of the machine. The MP receiving device and MC receiving device and the LH and RH and SP accumulators are of the usual type as customarily used in tabulating machines and are provided with electromagnetically operated clutches.

*Multi-contact relays*

The electromagnetically tripped multi-contact relays which are used in the machine in the MPR, CS and CR sections are those of the type customarily used in electric multiplying machines of this general type. Such relays may be of the form shown and described in the copending application of George F. Daly and James M. Cunningham, Serial No. 576,184, filed November 19, 1931, and also shown and described in the application of James M. Cunningham, Serial No. 606,585, filed April 21, 1932. In lieu of using such relays, however, a similar and simpler form of relay may be provided, which relay is of the type shown in Figs. 10 and 11.

Lower drive shaft 56b (Fig. 1a) drives operating cams 65, cooperating with bell crank follower members 66 and adapted to slidably shift serrated operating bars 67 for the multi-contact relay devices. The relays are of the mechanically positioned and restored electromagnetically controlled type.

Suitable side frame plates in the frame of the machine are slotted to receive a number of vertical plates 130. Carried on each plate is a magnet which will be designated X—1, X—2 and X—3, etc., when the relay is to be used for multiplier selection purposes, CS when the relay is to be used for column shifting purposes and CR when the relay is to be used for simple multiple circuit control purposes. These magnets CS and CR when energized serve to control the establishment or break of circuits at the multi-contacts of the relay. The magnets are used as trip magnets only and the armatures of these magnets do not actually shift their related contacts.

As previously explained, the cams 65 shift their respective followers 66 and transversely shift the serrated operating bars 67. Each plate 130, in addition to providing a mounting for the magnets X, CS or CR, also affords a mounting for contacts which will be generally designated 131 and 132. Contacts 132 at their upper ends have fastened thereto a strip of insulating material 133, which strip in turn has secured to it an L-shaped member 134. The member 134 has an upper portion which engages into the downwardly extending serrated notches of the bar 67. Member 134 also has downwardly depending from it and affixed thereto a bracket 135, which in turn has pivotally mounted on it a latch member 136. This latch member has slight limited rocking movement between limiting stop pins and is normally urged clockwise by the spring 137. The lower end of the pivoted latch member 136 cooperates with the latch piece 139 fixed to the pivotally mounted armature 140. 140 also has an upwardly extending tail portion 141 arranged in cooperative relation with the restoring abutment 142, carried upon and depending from the serrated operating bar. With the parts in the position shown in Fig. 11, the cam 65 has shifted the serrated operating bar 67 to a position in which the contacts 131 and 132 are kept open and to the position in which the strain is removed between the latch 136 and the latch point 139 of the armature assemblage. The relay magnet may now be energized and upon being energized, the latch portion 139 will be lowered, allowing the latch 136 to trip over the top of the latch point. Thereafter upon further rotative movement of the cam 65, the serrated operating bar 67 moves to the left and allows contacts 132 to close under their own spring action and establish contact with contacts 131. After a set of multi-contacts have been tripped in the above manner, the operating cycle of the machine ensues and subsequently the cam 65 again shifts its follower to cause the operating bar to take a movement of somewhat larger extent to the right and cause the armature knock-off bracket 142 to intercept 141 and knock off any previously attracted armature. Subsequent movement of the cam allows the serrated operating bar to move back to the position shown in Fig. 11. If any particular magnet is not energized, its corresponding armature will not be attracted and the latch member 139 will then prevent a closure of contacts 131 and 132.

In the subsequent description of the wiring diagram, certain of the contacts which have been generally designated 131 and 132 in the mechanical description of the relay, will be given designating numerals related to their associated control magnets. Thus, 1—CR—1 to 17 will designate the seventeen contacts controlled by the magnet 1—CR.

*Bill printer*

With certain types of accounting work, it may be desirable to make out bills and show on the bills computations and results derived from the record controlled and record making multiplying machine. Such bills would preferably have printed thereon the amount of the multiplier, the amount of the multiplicand and the amount of the product. A typical form of bill printer is shown in Figs. 1b, 8 and 9. Shaft 56 at its right hand end drives a gear 143, which in turn drives gear 144, having fixed thereto the notched element 145 of a one revolution clutch. The other element of the one revolution clutch comprises a pawl 146 carried on a pawl carrier 147, which is fixed to shaft 148. Gear 144 and clutch element 145 are freely rotatable on shaft 148. Shaft 148 through spiral gearing generally designated 149, drives the lower of the series of pairs of card feed rolls designated 150 (see Fig. 8). Cooperating with the lower card feed rolls 150 are upper feed rolls 151 gear driven therefrom and revolubly mounted in the side frame plates of the machine.

The shafts of the rolls 151 do not extend transversely entirely across the machine, but such rolls are mounted on short stud shafts in the frame of the machine. One upper roll 151 is provided at each side of the card. The bill printer is provided with a bill magazine 152 and the usual discharge hopper 153.

Picker 154 which is of conventional construction and crank operated, is driven in any suitable manner from the driving shaft 148, as by the driving train 155 (Fig. 1b).

Type bars 156 are provided, suitably supported for sliding movement and each bar carrying a selector rack 157. The customary type hammers 158 are provided, together with the usual ink ribbon 159 and a platen 160. (See Lake Patents Nos. 1,379,268 and 1,501,004.) Drive for the type bars and type hammers is provided in the following manner.

Referring to Fig. 1b, gear 161 on shaft 56 drives a gear 162 and the usual type of one revolution clutch generally designated 163, is adapted to provide drive to the shaft 164. Shaft 164 through spiral gearing 165 (see also Fig. 9) drives a cam shaft 166 and cam 167 on shaft 166 is adapted to shift follower arms 168 (see Figs. 8 and 9) and shift a cross bail 169 to the left. Spring pressed pawls 170 are carried upon bail 169 to impositively displace the type bars to the left. The type bars are differentially arrested by pawls 171 under control of print magnets 172.

Referring again to Figs. 8, 9 and 1b, cams 173 are provided to actuate a hammer actuating linkage 174. In the operation of the bill printing machine, a bill is withdrawn from a supply magazine and carried into the printing position over platen 160. The bill then remains at this position and the type bars then advance to a differential extent under the control of the printing magnets 172, and are arrested to present the proper type to the printing position. The hammer action then ensues to effect printing and subsequently the printed bill is delivered to the discharge stack at a time when a new bill is being fed into printing position.

As stated before, this bill printing mechanism in some cases can be completely dispensed with.

*Punching mechanism*

The punching mechanism is of the customary successive column acting repetition punching type as generally used in machines of this class. It is generally of the form shown in Lee and Phillips United States Patent No. 1,772,186 and in British Patent No. 362,529, corresponding to the United States application to Lee and Daly, Serial No. 391,874.

The mechanism of the punching section includes two card feed racks 181 and 182 (see Figs. 5 and 5a). 182 carries an arm provided with pusher fingers 183. The drive is by a separate motor Z—2, which through the driving train shown drives shaft 184 which has a ratchet shaped clutch element 185 fixed on one end of it. Alongside of 185 is a gear 186 which meshes with the lower teeth of 181. Secured to 186 is a disk 187. Pivoted on 187 is a member 188 provided with a ratchet shaped clutch tooth 189. Alongside of 188 is another member 188b which lacks the clutch tooth. On 188 is a pin 188c overlying an arcuate surface of 188b. The free end of 188b is connected to a toggle member 190 by a link 191. 190 is pivoted on 187 at 192. The opposite end of 190, remote from its pivot 192 is connected to a spring element 193, which spring tends to hold the clutch tooth 189 out of engagement with the clutch teeth of element 185 and allows it to engage when 190 is shifted. For the purpose of effecting a clutching action a punch feed clutch magnet 194 is provided. This magnet when energized attracts its armature and causes an arm 195 to engage a pin 196 (see Fig. 5a, in which figure the extension of this arm 195 is shown broken off for clarity of illustration of the other parts), depressing 188b and allowing 188 to descend so that the tooth 189 engages with the ratchet 185. Upon such engagement, the gear 186 will be driven in counterclockwise direction substantially a single revolution, shifting rack 181 to the left. This action will, through the card pusher shown in Fig. 5a, move the card from the R position to the R—1 position. Also when magnet 194 is energized, an arm 195a on the armature will close contacts 197. Such contacts are latched closed by a latch 198 (see Fig. 6). The latch 198 is tripped to allow the contacts to reopen by a knockoff 199 carried on the back of gear 186 (see Fig. 5a). At the termination of the counterclockwise movement of gear 186 the tails 200 of parts 188 and 188b will strike a projection 201 on a fixed plate to effect the disengagement of the tooth 189 from the ratchet 185. This action also restores the toggle parts to normal position.

The above driving action has wound up a spring in barrel 202. Upon disengagement of the one revolution clutch tooth 189, rack 181 returns to the right under the influence of the spring in barrel 202.

The driving train to the second card carriage rack 182 is as follows. Rack 181 has its upper teeth intermeshed with gear 203, which has secured to it a member 204 (see also Fig. 7) having a single notch or tooth disposed in the plane of a pawl 205 which is pivoted on part 206 fixed to the shaft 207. 207 on its opposite end carries a gear 208 which meshes with the card carriage rack 182. Suitable mechanism shown in Fig. 7 controls the co-action of pawl 205 with member 204 so that with the rack 181 in extreme right hand position pawl 205 will be disengaged from the clutch element 204. Such disengagement is effected by the rocking of 209 in a clockwise direction by the co-action of the pin 210 with a block 211 carried on rack 181. Upon initial movement of 181 to the left the block 211 will clear the pivoted camming element 209 allowing a slight counterclockwise motion of it so that 205 under spring action may rock and engage the tooth of member 204. Thereafter drive will come from 181 through gear 203, through 204, to pawl 205, to 206, to shaft 207 so that a clockwise rotational movement will be imparted to 207. This action will, through gear 208, traverse rack 182 to the right. The card carriage rack 182 will thus be shifted to extreme right hand position permitting the card pushers 183 (Fig. 5) to first ride over the surface of the card and ultimately engage back of the trailing edge of the card at the R—1 position. Rack 182 has associated with it a spring drive comprising the usual spring barrel 212. This spring is wound up by the traverse of 182 to the right and is adapted to cause a movement of 182 to the left under spring action. The rack 182 also has associated with it an escapement mechanism 213 having a dog 214. This escapement is more fully described in Schaaff United States Patent No. 1,426,223 and in Lee and Phillips Patent No. 1,772,186. The usual controlling contacts 215 customarily used in machines of this class are also provided, cooperating with the escapement parts.

Removably secured to the card carriage rack 182 is a skip bar 216 provided with a notched portion 217 which permits skip lifter lever 218 to descend when in the notch or to remain elevated when riding on the high part of the skip bar. When the skip lifter lever descends into the notch it allows the dog 214 of the escapement mechanism to cooperate with the ratchet teeth of rack 182. With skip lifter lever 218 riding on the top of the skip bar 216 the escapement will be disabled so that the card carriage rack 182 can traverse without stopping at each card column until the notch 217 is reached. Thereafter there is an intermittent motion of the card carriage to the left under spring action and under escapement control. When the skip lifter lever again rides out of the notch the card carriage rack 182 takes its full excursion of movement to the left. The location of the beginning of the notch in the skip lifter lever bar determines the position for the beginning of result or other punching. When the escapement dog is lifted up the contacts 215 are open as is customary in machines of this class. It may be explained that various forms of skip bars can be placed in the machine depending upon the class of work which is to be performed.

The punching mechanism proper need not be fully described as it is set forth in the Lee and Phillips patent above referred to and in British Patent No. 362,529. In brief it comprises a set of punches 219, which punches are adapted to be depressed to perforate the card through interposers not shown, but which are under the control of punch selector magnets 407 (Fig. 20d).

Referring to Fig. 5 there is shown disposed alongside of the card carriage rack 182 and fixed to the frame of the machine, a block or strip of insulating material 220. Disposed in this block are a number of spots 221 of conducting material and alongside of these spots is a common strip of conducting material 222. A suitable bridging piece or multiple brush assembly 223 is carried by the card carriage rack 182 and as this card carriage rack moves, the bridging brush 223 is displaced and establishes circuit connections from the common strip 222 to one of the spots 221 depending upon the columnar position of the card carriage rack 182. Spots 221 are preferably placed in two rows and inter-staggered as shown. This structure will be hereinafter termed a "reading strip".

Card ejector

Referring to Fig. 5, after the card has reached the R—1 position and has been traversed past the punches and has been punched or traversed past the punches without punching, it ultimately reaches a position at the extreme left hand of the punching section of the machine from which point it must be discharged into the discharge hopper. The card eject mechanism is shown in Fig. 5 with the parts shown in the position which they assumed before the machine was started itno operation or in the eject position. Upon the first card feeding operation through the punching section of the machine, rack 181 will have moved towards its extreme left position. After reaching the dotted line position shown in Fig. 5, 181 moves further to the left and thrusts a rack 224 to the left compressing coil spring 225. Bearing against a shoulder on rack 224 is a contact operating part 226. When 224 is thrust to the left, contacts P—3 which were previously closed, will open under their own spring action. The thrusting of 224 to the left will also allow a member 224a to rock and allow contacts P—4 which were previously closed to open. The displacement of rack 224 to the extreme left position will, through intermediate gears 227, rock a shaft 228 in a clockwise direction to bring an ejector clip assemblage 229 away from the position shown in Fig. 5 to a position in which the ejector clip can receive a card which has been advanced through the machine. With the ejector clip assemblage 229 disposed in such card receiving position the assemblage will be latched in such position by a latch 231, which latch is fully described in British Patent No. 362,529 (see latch 216 of that patent in Fig. 16). The ejector clip latch is adapted to be released by an ejector clip magnet 232. Upon energization of the eject magnet 232 latch 231 is released so that the ejector clip assemblage which has then grasped a card, swings from the card receiving position to the position shown in Fig. 5, in which position the jaws of the ejector are opened up so that a card can be discharged therefrom.

To prevent too violent ejecting movement of the ejector clip assemblage dash pot means may be provided for slowing down the ejecting action. Such dash pot is shown at 233 in Fig. 5 and the piston rod 234 of this dash pot may be connected to a bracket extending from member 224.

Contact devices in punching section of machine

The contact devices P—3 and P—4 have previously been described. In the punching section there are other contact devices as follows. Contact devices P—1 (Fig. 5a) are contacts which are closed when the rack 181 is in extreme right hand position and ready to receive a card from the card handling and sensing section of the machine. Contacts P—2 (Fig. 5a) are normally closed contacts and are arranged to open up when rack 181 makes a complete movement to the left. Contacts P—5 (Fig. 5) are also provided. Such contacts are operated as follows. An extension 235 on rack 182 is adapted, when rack 182 has passed beyond the last card column position, to allow contacts P—5, which were previously open, to close. Such contacts P—5 are normally open when rack 182 is in any of the positions to the right of the position beyond the last column position.

Readout devices

Referring to Figs. 12 and 13 which show the MP readout (MPRO), 240 is a clutch gear pertaining to the units order of the MP receiving device. Gear 241 is driven from this clutch gear and this gear in turn drives a brush assembly designated 242U, which traverses the segments 243 and current supply segment 244. There is also another brush 245U driven by gear 241, which traverses a segment generally designated 246, which segment is provided with a single contact spot at the zero position. Brush 245U also traverses a current supply segment 247. There is also a similar brush 245T which is positioned from the tens order clutch wheel 248 and which also traverses the segment 246 which contains only the single contact spot at the zero position. 245T also traverses current supply segment 249. Similarly, there is a brush 242T driven with brush 245T, which brush traverses segment spots 250, and which receives current from the common current supply segment 251. This arrangement of brushes and segments is repeated for the higher orders in the MPRO readout device, i. e., each alternative segment is like 246 with only a single spot in the zero position. Alternating with these segments are other segments similar to 243 and 250 with a multiplicity of spots on each segment.

The foregoing description has described the lower section of the MP readout. Such MPRO readout is also provided with a concurrently driven upper section. The brush parts of the upper section are driven as follows.

A gear 252 is driven from the intermediate gear 241, and this gear in turn drives a gear 253, which positions a single brush assemblage 254U. From the intermediate gear which is driven from the tens order clutch wheel, an intermediate gear 255 drives another gear 256, which in turn drives a brush assembly generally designated 254T. Both of the brush assemblies 254T and 254U traverse the segment 257 and individually traverse current supply segments 258 and 259. The arrangement for higher orders in the upper section of the MPRO readout is substantially the same. In short, in the upper section of the readout a single brush assembly is positioned from each clutch wheel and such brush assembly traverses common segments with the brush assembly pertaining to the higher order clutch wheel.

The wiring of the MPRO readout will be shown in connection with the description of the circuit diagram.

RHRO readout

The RHRO readout shown on Figs. 14 and 15 is substantially similar in construction to the upper section of the MPRO readout and which has just been described. In this readout the individual gears are driven directly from the denominational order clutch gears.

MCRO readout

Referring now to Figs. 16 and 17, the drive for the MCRO readout is substantially the same as the drive for the MPRO readout, which has previously been described. This MCRO readout, like the MPRO readout is a double readout with an additional top section. The arrangement of the segments of the MCRO readout is, however, somewhat different. Segment 260 which has the same location as the segment 243 of the MPRO readout, is different in that it contains nine instead of ten spots, there being no zero spot on segment 260. Segment 261 likewise contains nine spots and in this respect is unlike segment 246 of the MPRO readout which contains a single spot only at the zero position. The arrangement of the segments for the higher orders is the same. The top or upper extra section of the MCRO readout is identical with the top section of the MPRO readout.

LHRO readout

The LHRO readout is a single readout and the drive is substantially the same as for the lower section of the MPRO readout. The arrangement of segments, however, is somewhat different, viz. segment 262 corresponding to segment 243 of the MPRO readout is a ten spot segment. Likewise segments 263 and 264 and higher order segments are ten spot segments.

Emitters and cam contacts

The main counter drive shaft 56 is adapted to drive the cams of certain CC cam contact devices. These cams are correspondingly numbered on Fig. 1, CC—1 to 5. Also driven from the shaft 56 are three emitters 265, 267 and 268, which are of conventional construction. An impulse distributor 269 is also provided which is driven in unison with cams CC—1 to 5.

Reset control contacts

Figure 1:
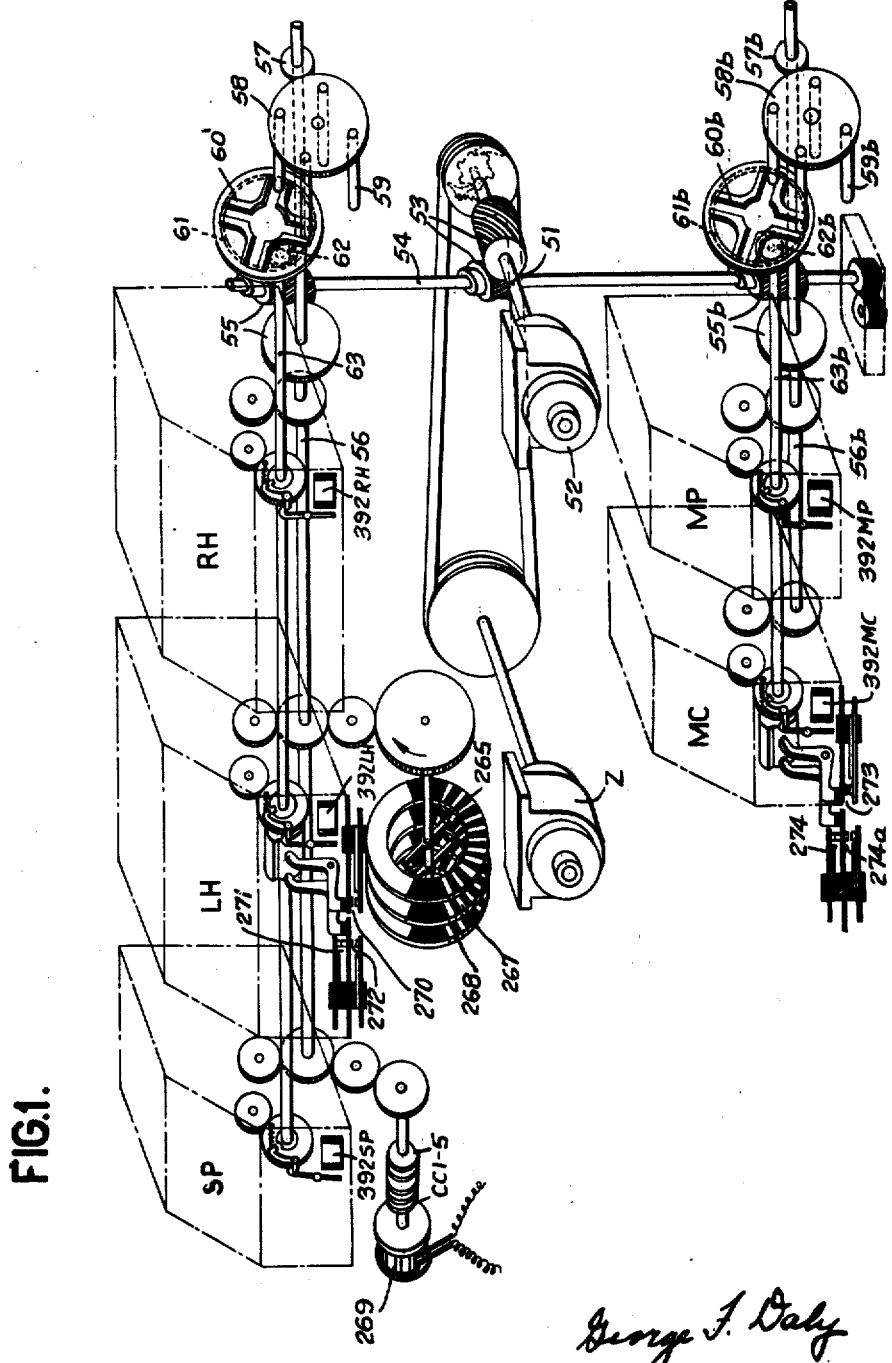

Referring to Fig. 1, the reset gear of the LH accumulator is shown provided with a cam adapted upon the reset of this accumulator to cause closure of contacts 270, and to cause opening of contacts 271 and closure of contacts 272. Similarly arranged reset contacts are provided in association with the MC accumulator, i. e. contacts 273 are adapted to be closed upon the reset of the MC accumulator and contacts 274 are adapted to be opened upon the reset of this accumulator and contacts 274a are adapted to be closed upon reset. 274 and 274a are three-blade contacts.

Inter-control between start and stop key contacts

Referring to Fig. 2, 275 are the start key contacts and 276 are the stop key contacts. Intermediate these contacts there is provided a spring urged latch member 277. The arrangement is such that upon the depression of the stop key, latch member 277 will keep the stop key contacts 276 open and the start key contacts 275 will also be kept open. Thereafter, upon depression of the start key to close its contacts 275, the latch member 277 will be rocked anti-clockwise to release the stop key contacts and to permit their reclosure. This interlocking control is provided for simplifying the control circuits in the machine, as will be more fully set forth in connection with the description of the circuit diagram.

Circuit diagram

In the following description of the circuit diagram, the machine operations will first be explained without reference to the printing of bills, and subsequently the bill printing operation will be explained. Certain alternative or class selection operations will also be subsequently explained.

In setting the machine into operation, prepunched cards are first placed in the card magazine of the machine. The first operation is then to close the switch 380 (Fig. 20c) providing current supply for the main driving motor Z. The motor Z drives the A. C. and D. C. generator 52 and the D. C. section of which supplies direct current to the D. C. buses 381 and 382. Alternating current impulses are supplied to ground and to bus 383 (see Fig. 20a, etc.). The start key is now depressed to close start key contacts 275 (Fig. 20e) and complete a circuit from the 381 side of the D. C. line through relay coil C, through contacts 275, through relay points G—1 now closed, through cam contacts FC—2, to the 382 side of the D. C. line. A stick circuit is established through the contacts C—2 of the relay coil C and cam contacts FC—8 now closed. Energization of coil C also closes relay contacts C—1 and a circuit is established traced as follows. From the 381 side of the D. C. line through relay contacts F—1, which are now in the position shown, through card feed clutch magnet 384 (see also Fig. 1a), through cam contacts FC—6 now closed, through stop key contacts 276 now closed, through relay points N—1 and C—1 now closed, through the punch control contacts P—1 now closed and back to the other side of the line.

In the present machine the start key must be held depressed for the first four cycles in starting up upon a run of cards, or alternatively it may be depressed and released and then depressed a second time. Starting is prevented until the feed rack 181 of the punch is in right hand position. This is provided for by contacts P—1. The first complete card feed cycle upon starting up the machine, will advance the first card to a point where the X (first extra index point position of the card) will be in alignment with the special X brush 106, in which position the nine index point position of the card will be about ready to pass under brushes 109. At the beginning of the second card feed cycle, the card traverses the brushes 109 and the multiplier and the multiplicand are read from the card and are entered into the MP and MC receiving devices. At the end of the first card feeding cycle the card lever contacts 112 will be closed by the card, causing energization of relay coil H and cause relay contacts H—1 (Fig. 20a) to shift from the position shown to reverse position. As the second card feed cycle ensues, the card is carried past the brushes as before explained and amounts are entered into the multiplicand and multiplier counters.

The entry circuits will now be traced. Current flows from the A. C. line 383 (Fig. 20a) through relay contacts H—1 now shifted, through cam contacts FC—7 which close at the proper time in the cycle, through the impulse distributor 269 and to card transfer and contact roll 87, thence through the brushes 109 pertaining to the multiplier (these being designated 109MP on Fig. 20a), through the brushes 109MC pertaining to the multiplicand to the plug sockets of the plug board 385. The customary plug connections are provided at this plug board and connected to the lower plug sockets are three blade contacts 386 and 387. Such three-blade contacts are in the position shown for normal multiplying operations and may be manually shifted by the manual member 388 to reverse position for checking purposes. The function of such three-blade contacts for checking purposes is to reverse the entries of the multiplier and multiplicand, causing the multiplier to be the multiplicand and the multiplicand to become the multiplier. The cross wiring generally designated 389 and the three-blade contacts provide for such reversal. The entry circuit extends to the multiplier magnets 390MP and to the multiplicand magnets 390MC. For normal multiplying operations, switch 391 is thrown in closed position as shown. The ground return circuit from the 390MC magnets is through the closed relay contacts A—2, which are in the position shown. The return circuit from the 390MP magnets is via switch 391 and the relay contacts A—2 now closed. The contacts A—2 will be reversely thrown from the position shown by the energization of relay coil A as will be hereinafter explained. During entry of the multiplier and multiplicand upon normal multiplying, coil A is de-energized.

It may be explained that there is a manual starting up of the card feed for the first cards of a run, but that after the machine is fully in operation on subsequent cards in a run, the feed is otherwise controlled, being effected automatically. Subsequent card feed operations are initiated automatically upon and by the reset of the multiplicand counter. Provision is accordingly made to cut off the hand initiating control after the operations have been properly started. This is effected in the following manner. At the beginning of the second card feed cycle the closure of cam contacts FC—11 will cause relay coil G to become energized. Current flows from 381 through G, through FC—11, through the card lever contacts 112 now closed, and back to the other side of the line. The energization of relay coil G will shift the three-blade relay points G—1 to reverse position from that shown, interrupting the circuit to the start key contacts 275, but maintaining the circuit to cam contacts FC—2. The energization of relay coil G will also close relay contacts G—2 and establish a stick circuit for coils G and H, through either the FC—2 contacts or the card lever contacts 112. It may be explained that the making time of cam contacts FC—2 overlaps the time when the card lever contacts 112 open between cards.

The card is fed through the card handling section of the machine and ultimately it passes to the R position in the punch, closing card lever contacts 120 and energizing relay coil F, and causing the shifting of relay contacts F—1 to reverse position from that shown. In starting up the machine, the punch racks are in extreme outer position, i. e. rack 181 is in its extreme right hand position and 182 is in its extreme left hand position (see Figs. 5 and 5a). Accordingly, contacts P—1 are closed and contacts P—3, P—4 and P—5 are closed. With contacts P—5 closed, relay coil K will be energized and relay contacts K—1 will be shifted to reverse position from that shown. Upon the shifting of relay contacts F—1 and upon the closure of cam contacts CC—3, a circuit will be established to the punch clutch magnet 194. This circuit is completed to the other side of the line through the punch contacts P—3 now closed and contacts K—1, which are in shifted position. The energization of the punch clutch magnet 194 in the manner previously explained, will cause closure of contacts 197, which become latched closed by latch 198. Accordingly, current supply is provided for the punch driving motor Z—2. The card which has been previously read and which is in the punching unit in the R position, is now advanced endwise through the punch unit to a position in which punching is to commence.

According to the present invention, the actual multiplying operation and the setup of the cycle controller is initiated by the reset of the LH accumulator. Such reset of the LH accumulator is initiated and effected in the following manner.

It has been previously explained how relay coils F and K were energized. Energization of these two coils closes relay contacts F—2 and K—2 (Fig. 20a). Upon closure of cam contacts CC—2, current flows from line 383, through CC—2, through switch 266 now closed, through relay contacts K—2, through normally closed relay contacts L—2, through relay contacts F—2, through the 392LH reset magnet and back to ground. Energization of magnet 392LH initiates the resetting of the LH accumulator (see Fig. 1). It may be explained that resetting cannot occur until the relay contacts of K—2 are closed, which can occur only when a card is in the punch beyond the last columnar position or in starting up the machine when the punch racks are in proper position, i. e. extreme outer position. It may also be explained that relay coil F cannot be energized with the attendant closure of contacts F—2 until a card has reached the R position in the punch. Accordingly, reset of the LH accumulator cannot be initiated until both of these conditions are fulfilled.

During the reset of the LH accumulator the reset contacts 272 (Figs. 1 and 20e) close and a circuit is established to relay coil L, energizing this coil and causing the opening of relay contacts L—2 (Fig. 20a) to accordingly prevent a repetition of the reset of the LH accumulator. It may be explained that relay coil L is only temporarily energized by the closure of contacts 272. However, a stick circuit is established for relay coil L, through relay contacts L—1, which close upon the energization of L, the stick circuit going back to the other side of the line through the punch contacts P—2 which are now closed. Contacts P—2 remain closed until the punch rack 181 has completed its traverse to the left, at which time such contacts P—2 open. At this time relay coil L will become de-energized, but at such time coils K and F will have also become de-energized. Accordingly, the circuit to the reset magnet 392LH is completely broken and a new reset cannot be initiated until there is a reclosure of contacts K—2 and F—2 following a subsequent energization of K and F.

If in the operation of the machine the last column contacts P—5 close at a late time with respect to the closure of CC—2 there may be too short a duration of current supply to the 392LH reset magnet so that reset will not occur. Under these conditions the proper reset circuit will be established when CC—2 again close since preceding such subsequent closure of CC—2 the contacts P—5 will remain closed and keep K energized to keep relay contacts K—2 closed before the reclosure of CC—2. This control is effective since if the LH accumulator is not reset a new multiplication will not occur.

In certain multiplying machines for mechanical reasons, the LH accumulator instead of being made as a single accumulator as here shown, is made as a double accumulator with a transfer between the two units. In such instances it is desirable that provision be made for insuring that both accumulator sections reset. Where such split LH accumulators are provided, it is desirable to provide a pair of contacts 272, having one pair of such contacts on each section of the LH accumulator and to wire such pairs of contacts in series. With this arrangement and series wiring it would follow that the relay coil L would not be energized until both counter sections were properly reset. With a sub-divided LH accumulator, two reset magnets 392LH would be provided, such magnets being wired in parallel. Such a split construction is shown in British Patent 405,031.

The machine is now ready to set up the cycle controller and follow with the actual multiplying operations. Upon reset of the LH accumulator a circuit is established, traced as follows. From the 382 side of the D. C. line (Fig. 20a) through the reset contacts 270 which become closed upon reset of the LH accumulator, through relay coils M and N and back to the other side of the line 381. With a split LH accumulator, two reset contacts in line 382 would be provided—one on each section of the accumulator and such contacts would be wired in series. Such series wiring is a safety inter-control for the split accumulator type of machine.

The energization of relay coil M will close relay contacts M—1 and M—2. M—2 establishes a stick circuit for the relay coils M and N, through a wire 440 (Figs. 20a, 20b, 20c, 20d and 20e) through the now closed multiplicand reset contacts 274.

Column skip and cycle controller

The cycle controller and zero column skipping arrangement will now be described. In the cycle controlling section of the machine there are a number of relay coils which will be respectively designated Yu, Yt, Yh, Yth, Ytt, Yht, Ym and Ytm. The suffixes u, t, h, th, etc., designate the related columnar orders, u designates units, t designates tens and so on. All of the Y coils have two sets of relay contacts associated therewith. One set will be given the general suffix designation 1 and the other set the general suffix designation 2. For example, Yu has associated with it stick relay contacts Yu—1 and it also has associated with it column transfer relay contacts Yu—2. A similar arrangement of relay contacts is provided for all of the various Y relays on the various columns. The "1" set of contacts are for stick circuit purposes and the "2" sets of contacts are for column transfer purposes. The CS relays, previously referred to, are also shown on Fig. 20a and they are respectively designated CSu, CSt, CSh, CSth, CStt, CSht, CSm and CStm. In addition to the multi-point column shifting control contacts which have been generally designated 131 and 132 in the previous description (see also Fig. 20c), each CS unit has an additional control contact pair which will be given the suffix reference numeral 3, that is CSu—3 is this extra pair of contacts which is adapted to be closed upon the energization of CSu, and so on for the other CS relays in the other columns.

If any brush of the multiplier readout stands upon a zero spot, its corresponding Y magnet will be energized. Current flowing from the D. C. line 382 through the reset contacts 274, through the relay contacts M—2 now closed, over via wire 392, through the zero spots of the MP readout device, then via the corresponding brush or brushes standing on the zero spot or spots and then through the respective circuits shown to the respective Y magnets, and back to the 381 side of the D. C. line. Also connected to one side of relay contacts M—2 is a line 393, which extends over and connects with one side of each of the Yu—1 to Ytm—1 and CSu—3 to CStm—3 group of contacts. The other side of these contacts are wired back to their respective Y magnets and there through to the other side of the D. C. line 381. Accordingly, when any Y magnet becomes energized due to a brush standing on a zero spot in its corresponding column, the energization of this particular Y magnet will close its corresponding Y—1 stick contacts and the Y magnet will remain energized through the current which flows over through line 393. It will be assumed that no zero appears on the units column of the read out, but that zeros appear on the tens and hundreds column and that a significant figure appears in the thousands column. With this condition, coils Yh and Yt will become energized and will be held energized by their stick relay contacts Yh—1 and Yt—1. The energization of Yh and Yt will also shift contacts Yh—2 and Yt—2 to the reverse position from that shown The stick circuit energization of the Y magnets will maintain these contacts Yh—2 and Yt—2 shifted. Yu—2 will not have been shifted because its corresponding coil Yu has not been energized. The same will also apply to the Yth—2 contact.

The machine is now ready to multiply by the amount in the units order of the multiplier. Initiation of multiplication is effected in the following manner. Upon the energization of relay coil M the relay contacts M—1 close. Following the setup of the cycle controller, cam contacts CC—2 close. Current is allowed to flow from the A. C. line 383 through cam contacts CC—2, through switch 266, through relay contacts M—1 now closed, through the Yu—2 contacts which are in the position shown, down through the CSu relay magnet and out via the brush which is standing, say, on the five spot of the readout in the units order, down through the fifth line of the group of wires generally designated 394 to the X—5 multiplying relay control magnet (see Fig. 20b) to ground. The time of flow of current in the path just traced is timed according to the closure of cam contacts CC—2 (Fig. 20a). It will be accordingly appreciated that there is a concurrent energization of the CSu magnet and the X—5 multiplier magnet, since these control magnets are disposed in series relation. Energization of the X—5 magnet brings about the multiplying computation and the energization of CSu directs the entries into the proper columnar orders of the RH and LH registers in a manner to be subsequently explained.

It has been previously explained that when the multi-contacts of the CSu relays close, that an extra contact pair CSu—3 is also closed. This closure of the CSu—3 contact pair which takes place as an incident to the flow of current to the X—5 magnet, through CSu, causes the energization of the Yu relay, which relay, it will be remembered, was not previously energized because its corresponding readout brush did not stand on a zero spot. The energization of Yu then shifts the relay contacts Yu—1 and Yu—2 so, that, upon the succeeding multiplication by the next significant figure, current flowing in through M—1, 266, and CC—2 will be diverted by Yu—2 over to the Yt—2 set of contacts which are in the reverse position from that shown, thence over through the Yh—2 contacts which are in reverse position from that shown (since their coils Yt and Yh have been previously energized by their corresponding readout brushes standing on zero spots of the readout device) and over to the Yth—2 contacts which are in the position shown, since they have not been shifted by energization of Yth by a brush of the readout standing on a zero spot. The next multiplying current impulse then flows down through Yth—2, through CSth, over through the brush of the readout to the particular wire of the 394 group, say the seventh wire and down through the X—7 magnet and out to ground upon closure of cam contacts CC—2. This current flow will effect a concurrent energization of the X—7 magnet and the CSth magnet and the energization of CSth will make direct a proper entry of amounts into the LH and RH accumulators at a shifted over columnar relation therein.

The manner of effecting multiplication need not be traced in detail. It is sufficient here to state that the energization of the X magnet of the multiplying relays establish their related contacts, shown on Fig. 20b, and at the proper time in the operation of the machine, current impulses flow from the emitter 265, through the multiplying relay control contacts. Such impulses flow over the lines generally designated 397LH and 397RH to the LH and RH sections of the multiplicand readout MCRO. The multiplicand readout device allows selected impulses to flow to the LH component lines 398LH and to the RH component lines designated 398RH. The lines 398LH and 398RH (see Fig. 20c) extend down to the various points 131 of the CS relays, being wired as shown in Fig. 20c, and the other points 132 of these relays connect to the LH and RH lines 399 LH and 399RH, which latter lines connect to the counter magnets 390RH, pertaining to the RH accumulator. The 399LH lines extend directly to the LH accumulator counter magnets 390LH. In previous machines such 399LH lines extended to three-blade transfer control contacts, but such construction is not required in the present machine. In the foregoing way, partial products are entered into the LH and RH accumulators and as successive multiplying cycles ensues, there is a selected energization of the CS magnets to direct the entries into the proper and shifted over orders of the accumulators.

Upon the completion of the multiplying computation all of the Y—2 set of contacts will have been shifted to reverse position from that shown and upon closure of cam contacts CC—2, there is a circuit path from the 383 side of the A. C. line through CC—2, switch 266 and M—1 now closed, through all of the Y—2 set of contacts now in shifted position, to the 1—CR relay magnet, and to the 392MC magnet which is the reset magnet pertaining to the MC receiving device. A branch circuit also extends through cam contacts FC—10, through switch 395 which is in closed position as shown for normal multiplication, through the 392MP reset magnet, through the switch 396 (in closed position as shown for normal multiplication) and back to ground. Energization of 392MC and 392MP initiates resetting of the MC and MP receiving devices. The purpose of the energization of 1—CR will be subsequently explained and it will also be understood that the reset of the MP and MC accumulators does not take place until actual multiplication is completed.

After the multiplying computation is complete for a given problem, the amount in the RH accumulator is transferred over to the LH accumulator. This transfer over operation is permitted by the energization of multi-contact control relay 1—CR (Fig. 20a) in the manner previously explained. Energization of this relay permits closure of the related contact contacts 1—CR—1 to 16 (Fig. 20c) and 1—CR—17 (Fig. 20b). Closure of 1—CR—1 to 16 connects the RHRO readout with the 399LH lines. Accordingly, upon the operation of emitter 265, impulses are emitted through a group of lines 430 (Figs. 20b and 20c) to and through RHRO readout device (Fig. 20c), through the 1—CR—1 to 16 contacts and to the LH accumulator magnets. The amount previously standing on the RH accumulator is entered into the LH accumulator in proper columnar relation therein. At the completion of such emission of impulses by emitter 265, the emitter brush on encountering the extra spot, supplies current through contacts 1—CR—17 now closed, to RH reset magnet 392RH. Energization of this magnet initiates reset of the RH accumulator.

It may be explained that the reset of the MC and MP counters occurs concurrently with the RH and LH transfer. The reset of the MC receiving device will cause the opening of contacts 274 (Fig. 20e). The opening of contacts 274 breaks the stick circuit for relay coils M and N and for all of the Y magnets, thus preparing the cycle controller for a new entry from the following card.

The reset of the multipland receiving device brings about the closure of contacts 273 (Fig. 20e) which causes energization of relay coil C, and the closure of contacts 274a causes the energization of relay coil D. The energization of coil C causes closure of contacts C—1 and there is a re-initiated energization of the card feed clutch magnet 384, through a circuit traced as follows. From the 381 side of the line through contacts F—1, which are now in the position shown, through the card feed clutch magnet 384, through cam contacts FC—6 now closed, through the stop key contacts 276 now closed, through relay points N—1 and C—1 now closed, contacts P—1, to the other side of the line. Reinitiation of the card feed is prevented until the closure of contacts F—1 and contacts P—1. It may be mentioned that relay coil C is maintained energized through stick contacts C—2 and through cam contacts FC—8, which open up after the feed has been initiated.

Before or upon punching of the product amount back upon the record there is a transfer over of the product from the LH accumulator into the summary products accumulator. Bill printing of the product may also occur at this time, as will be hereinafter explained. Such transfer over of the product amount to the summary products accumulator is brought about in the following manner.

Energization of relay coil D (Fig. 20e) causes closure of relay contacts D—2, establishing a stick circuit for relay coil D through cam contacts CC—1, which are now closed and which open up later in the cycle. Energization of D also shifts the relay contacts D—1 (Fig. 20d) to reverse position from that shown and provides current supply to emitter 267 from the 383 side of the A. C. line. At this time emitter 268 is cut out of circuit. The emitter 267, emits impulses through one section of the LHRO readout and through plug connections at plug board 400 to the 390SP magnets. In this way the amount of the product is transferred over into the summary products accumulator.

The machine is now ready to punch out the product back upon the record from which the factors which entered into the computation were derived. This is initiated in the following manner.

Early in the reinitiation of the card feed cycle, cam contacts FC—4 (Fig. 20e) close, energizing relay coil B, closing stick contacts B—2 and providing a stick circuit for relay coil B through the LH reset contacts 271 (Fig. 20e) now closed. The energization of relay coil B also closes relay contacts B—1.

In the present machine a three point switch 401 (Fig. 20e) is provided which can be thrown to a middle position to connect with point 402, or thrown to an upper point 403 or to a lower point 404.

In previous machines provision was made for checking the multiplication by reversing the multiplier and multiplicand. When such checking operations were performed, provision was made to suppress punching by a suitable switch. In certain cases, however, it is desired that checking be effected with punching and in other cases that checking be effected without punching and in other cases where simple multiplication is being performed multiplication should be effected with punching. The three point switch 401 is for this purpose. It is thrown to the upper 403 position for checking and punching, to the lower position 404 to cut out the punching, and to the intermediate position 402 for simple punching in connection with straight computing. A switch 405 is also provided, which is thrown to the position shown for normal multiplication and to the lower reverse position for rate card multiplication. The supplemental three-blade contact 386a is also provided, having its upper blade wired to the switch 405 and to the switch point 403, and having its intermediate blade wired to the switch point 402. This three-blade contact 386a is manually shifted by the member 388 (see Fig. 20a). With switch 401 in intermediate position on spot 402 and with switch 405 in upper position, the circuit to the punching mechanism is as follows.

From the 382 side of the line through relay points B—1 (closed in the manner previously explained), through the escapement contacts 215 on the punch, through switch 401, switch point 402, through the three-blade contact 386a, through switch 405 in upper position, to the line 406 which leads up (see Fig. 20d) to the common conducting strip 222 on the punch.

With current supplied to the common strip 222 and with the brush 223 standing upon the first of the spots 221 at the first product punching position, punching will commence, there being a readout through the related section of the LHRO readout and an energization of punch selector magnets 407. The closure of relay contacts B—1 in the manner previously explained, also supplies current to contacts 408 in the punch, which contacts are closed by interposer action in the punch in the usual way to supply current to the main punch operating magnet 409. Contacts 408 correspond to contacts 94 of Bryce Patent No. 1,866,995 and to contacts 95 of the Lee and Daly application and British Patent No. 362,529. Magnet 409 corresponds to punch magnet 54 of the Bryce patent and to maget 49 of the British patent. Punching will continue until the complete product is read out and punched. When the punching is completed, the card carriage rack 182 will escape to beyond the last column position. Contacts P—5 (Fig. 20e) will be closed, energizing relay coil K, shifting relay contacts K—1 to establish a circuit to the eject magnet 232. The punched card will then be ejected from the punch.

A new multiplying operation will then be initiated upon the succeeding record card. Such succeeding operation is initiated by the closure of relay contacts K—2 (Fig. 20a) and by the reset of the LH accumulator. The reset of the LH accumulator initiates a new operation upon the following record in the manner previously explained. It may be also explained that upon the reset of the LH accumulator reset contacts 271 (Fig. 20e) open to break the stick circuit for relay coil B and cause relay points B—1 to open the circuit to the punch operating magnets and to cut off the circuit to the common strip 222 of the punch.

It will be remembered that according to the present machine that a computing operation is initiated by the reset of the LH accumulator, such reset effecting the closure of contacts 270 and setting up the cycle controller and bringing about a computing operation. When short multiplications are being performed there is the possibility without a special control that such short multiplications will be completed followed by a reset of the LH accumulator before the record card in the punch will have been fed in the punch to a position in which contacts P—5 are open or to a position in which card lever contacts 120 are open. If such short multiplications occur, the circuit control conditions of the punch at contacts P—5 and card lever contacts 120 would be such that a second resetting operation could be automatically initiated. If such second resetting operation could be automatically initiated there would be erroneous results secured and a double multiplication would ensue. To prevent such double multiplication under these conditions provision is made for opening the reset control circuit through relay contacts F—2 and relay contacts K—2 after a first resetting operation. Such control is provided for by relay contacts L—2, which relay contacts are opened up during an energization of relay coil L (Fig. 20e) upon the first reset of the LH accumulator. With such contacts L—2 (Fig. 20a) opened up upon the first reset of the LH accumulator there is no possibility of a second reset and of the automatic initiation of a second unwanted multiplying operation at this time.

It may be explained that after relay points L—2 once open up they are maintained open by the maintained energization of relay coil L (Fig. 20e). Relay coil L is maintained energized through stick contacts L—I and through the circuit through punch contacts P—2 and accordingly a new reset initiating circuit cannot be re-established until there is a reclosure of relay contacts L—2 (Fig. 20a) and such reclosure must follow the opening of contacts P—2 on the punch which occurs after the proper card feed has taken place in the punch.

The summary products accumulator is reset by depressing summary products reset key 410 (Fig. 20a). On the depression of this reset key and upon the closure of cam contacts CC—2, a circuit is established through switch 266 now closed, relay contacts K—2, which will be closed, through the summary reset key contacts 410, through the 392SP reset magnet and back to ground.

Summarizing, the operations of the machine as so far described are as follows. On first starting up the machine card feed is manually initiated. For subsequent operations during a run of cards, card feed is automatically initiated by the reset of the multiplicand receiving device. The feed of the first card will bring about a reset of the LH accumulator and the reset of this accumulator will in turn set up the cycle controller by energizing relay coil M. The cycle controller in turn will initiate and control the computing cycles of the machine. As the computing cycles proceed, a sequence circuit is successively established through the Y—2 contacts of the cycle controller and after multiplication is complete flow of current through this sequence circuit so established, directly brings about an energization of the RH to LH transfer controlling magnet, the multiplicand reset magnet and the multiplier reset magnet. Reset of the multiplicand entry receiving device initiates a new card feed. At the completion of the RH to LH transfer, upon the emitter 265 encountering the extra spot, the reset of the RH accumulator is initiated. Reset of the multiplicand accumulator also initiates a transfer of the product to the summary products accumulator. The reset of the multiplicand receiving device also breaks the setup of the cycle controller by de-energizing relay coil M and other magnets of the cycle controller. The action of feeding the new card will initiate the punching of the previously computed product back upon the previously sensed and computed record. The reset of the LH accumulator is initiated automatically following the punching of this product under dual control conditions of the punch, one control is based upon the previous card reaching the position beyond the last column position in the punch and the other control is based upon a new card being fed to a particular position (i. e. the R position) in the punch. The reset of the LH accumulator then initiates a new setup of the cycle controller and a new multiplying operation is initiated by the cycle controller as so set up under the control of the reset of the LH accumulator.

In previous machines, while the completion of the sequence circuit through the cycle controller controlled the RH to LH transfer, flow of current in such sequence circuit did not directly and of itself bring about a reset of the MC and MP receiving devices, but such receiving devices were reset as an incident to the RH to LH transfer action and under supplemental contact control. The construction herein used, provides for the simplification of the multiplier reset upon rate card operation and furthermore generally simplifies the reset circuits for the MC and MP receiving devices, effecting a direct reset instead of an indirect reset as heretofore.

Rate card multiplication

The present machine may be arranged to multiply amounts in each of a group of cards by a common rate or multiplier. This common multiplier factor is punched in a special rate card, which rate card is distinctively punched, for example in the X position, and which card is placed to precede a group of detail cards in a card run. With rate card multiplication, groups of detail cards, each preceded by a rate card, are inserted in the feed magazine and the machine started in the usual manner. Controls are provided so that the multiplier receiving device will be reset each time a new rate card passes through the machine prior to the reading of the multiplier amount from such rate card into such multiplier receiving device. For rate card multiplication, the switches 391 and 396 (Fig. 20a) and switch 405 (Fig. 20e) are placed in the reverse position from that shown on the circuit diagram and switch 395 (Fig. 20a) will be thrown to the position shown in the diagram. When the rate card which is punched in one of the extra index point or X positions, is about to pass the brushes of the machine, the X index point of the card will be in line with the X brush 106 and the hole in the card at the X position will cause establishment of the X brush circuit and energize the relay coil A, the circuit being completed through contacts FC—5 and relay contacts H—2, which are now closed.

A stick circuit for relay coil A is established through the relay contacts A—3 and contacts FC—3 to the other side of the line. The energization of relay coil A (Fig. 20e) shifts relay contacts A—2 and A—I to reverse position from that shown on Fig. 20a. The shifting of relay contacts A—2 cuts off the return circuit from the 390MC magnets, but maintains a return circuit to ground from the 390MP magnets. Consequently the amount of the rate or multiplier may be entered from the rate card, but no entry will be made from the rate card into the multiplicand receiving device. The relay contacts A—I establish a return circuit for the 392MP reset magnet so that the multiplier counter will become reset concurrently with the reset of the multiplicand receiving device at the end of a run of computations on a number of detail cards. Such reset will occur prior to the reading in of the new multiplier into the MP receiving device from the new rate card. With rate card operations, provision is made to eliminate punching back an imaginary product on the rate card itself. It will be remembered that the rate card contains a multiplier factor only and there is no multiplicand factor on such card. Suppression of punching of an imaginary product on rate card operations is effected in two different ways, one control being provided when the first rate card passes into the machine and a different control being provided when the machine is operating on a run of cards with a rate card intermediate groups of detail cards. The first control condition will first be described.

When the constant multiplier is read in from the first rate card preceding the first group of detail cards the card eject assembly in the punch will be in the position shown in Fig. 5 and contacts P—4 will be closed.

Referring to Fig. 20e contacts 411 are the usual so-called list contacts in the multiplier receiving device and one of these contacts is provided for each order and such contact is arranged to be closed upon the entry of a figure into its corresponding order of the multiplier receiving device. Such contacts 411 may be of the type shown in the Lake Patent No. 1,534,531, dated April 21, 1925 (see contacts 50 in Fig. 2 of that patent). With such a contact arrangement in the multiplier receiving device it will be appreciated that the entry of any significant figure amount into the multiplier receiving device will establish a circuit to relay coil J energizing this coil. The energization of relay coil J will close stick contacts J—1 and establish a stick circuit through contacts P—2 now closed. Upon the energization of J and closure of contacts J—1, a circuit is also established to energize relay coil E through contacts P—4 now closed. The energization of relay coil E will close stick contacts E—2. Relay coil E remains energized as long as J is energized and as long as contacts P—4 are closed. The rate card passes through the card handling section of the machine and into the punch and after being placed in the punch, the punch immediately traverses the rate card to the position at which product punching would normally begin to occur. This traverse of the rate card from R position to the R—1 position is initiated and effected in the manner previously explained for an ordinary multiplier and multiplicand detail card. The traverse of the rate card from the R position to the R—1 position will have brought about an opening of contacts P—5 and such contacts P—5 will open before there is an opening of contacts P—4. The opening of contacts P—5 will de-energize relay coil K which was previously energized in the manner previously described so that relay contacts K—1 assume the position shown in the diagram (Fig. 20e). With relay contacts K—1 in this position a stick circuit is established for relay coil E through contacts E—2 now closed. Accordingly, the arrangement provides for the establishment of a stick circuit for E before contacts P—4 open, such contacts P—4 previously having maintained the energization of relay coil E. Ultimately contacts P—4 become open, such opening being effected upon the complete traverse of rack 181 (Figs. 5 and 5a) to the extreme left hand position. When the rack 181 is in this extreme left hand position contacts P—2 will open to break the stick circuit for relay coil J. At such time the 411 list contacts will have reopened because such contacts only close momentarily during the entry of an amount from the rate card.

The energization of relay coil E as above described will have shifted relay contacts E—1 to reverse position from that shown on the diagram. With the constant factor from the rate card entered into the multiplier receiving device but with no amount entered into the multiplicand receiving device the machine will then proceed to attempt to multiply the zero multiplicand amount in the MC receiving device by the constant multiplier amount. Idle multiplying cycles will ensue since zeros multiplied by a real number amount gives a result of zero and after these idle cycles are completed there will be an ultimate reset of the MC receiving device. The reset of the MC receiving device will have initiated a new card feeding operation on the first detail card of the following group and will have energized relay coil B. The energization of relay coil B will close relay contacts B—1 so that a circuit will be established traced as follows. From the 382 side of the line through B—1 now closed, through escapement contacts 215 on the punch now closed, switch 401 at the 402 position, through contacts 386a, switch 405 at the position reverse from that shown, through contacts E—1 now in reverse position from that shown on the circuit diagram, via wire 412 direct to the main punch operating magnet 409 and back to the 381 side of the line. With the 409 magnet energized in the manner just described the rate card escapes through the punch without any punching being effected thereon. It will be noted that ordinarily 409 is controlled by the interposer control contacts 408 but under the conditions just described the interposer contacts 408 are shunted out so that no interposers need be thrust forward to effect the energization of 409. As the punch escapes from column to column, escapement contacts 215 open and then reclose to provide the repeated energization of 409 for escaping the rate card through the product punching position in the punch. The rate card ultimately passes through the punch to the eject position and is ejected. Upon completion of the ejection of the rate card there is an initiation of the multiplying operations of the constant rate amount from the rate card which is now in the MP receiving device, by the multiplicand amount derived from the next detail card and entered into the MC receiving device.

The control condition as stated above is different when a constant multiplier amount is read from a succeeding rate card disposed between two groups of detail cards. Under this kind of an operation punch contacts P—4 in place of being closed at the time relay coil J is energized are open because punching of the product in the previous detail card will not have been completed. However, at the completion of such punching and upon eject of the previous detail card, contacts P—4 will close and when such contacts P—4 close the coil E will become energized. The energization of coil E will bring about the passage of the rate card through the punch without any product amount being punched thereon as before.

It may be explained that the above modified control is provided to prevent a shift of contacts E—1 while a previous detail card is being punched because if such contacts E—1 were shifted while the previous detail card was being punched there would be a suppression of punching on the last detail card and such suppression of punching on such card is naturally not wanted. In other words, the above modified control delays the shift of the relay contacts E—1 until the previous detail card has been completely punched with its product.

With previous machines while rate card control was provided, suppression of punching on the rate cards was under the control of the reset of the MP receiving device, which reset was effected on rate card operation under X brush control. According to the present invention the suppression of punching is under control of the entry of rate amounts into the MP receiving device upon rate card multiplications. This is effected by the list contacts 411 which are disposed in the MP receiving device. Heretofore such contacts were disposed in the MC counter and were used for one-half cent pickup control.

*Switches for alternative controls*

The position of switches for normal multiplying where punching is to be effected on each card handled is as follows. Switch 405 for normal multiplying will be placed in the position shown in Fig. 20e. In this position all computed products will be punched on their respective cards. Switch 401 (Fig. 20e) will be placed on the 402 switch point and will also provide for punching products on all cards. If punching is to be eliminated on all cards, for example when summaries of products only are desired, switch 401 will be placed on point 404. This will cut out product punching. For normal multiplying operations switches 391, 396 and 395 will all be thrown to the closed full line position as shown on Fig. 20a. Switch 391 when in the position shown provides for the entry of both a multiplier amount and a multiplicand amount from each card. Switches 396 and 395 provide for the reset of the MP receiving device after each card is handled.

*Position of switches for checking operations*

Rate card switch 405 will be left in the position shown. Switch 401 on checking operations when connected with switch point 402 will provide for checking with the suppression of product punching and when thrown to the 403 position will provide for checking with product punching. On checking operations, switches 391, 396 and 395 (Fig. 20a) will be in the position shown in the circuit diagram.

*Switch positions on rate card multiplication*

Switch 405 (Fig. 20e) is thrown to reverse position from that shown on the circuit diagram to provide for elimination of punching in the rate card. During rate card operations switch 401 is thrown to the 402 position to provide for punching in each of the detail cards. If thrown to the 404 position punching in the detail cards would be eliminated. During rate card operation switches 391 and 396 (Fig. 20a) are thrown to open position and switch 395 is left in the closed (full line) position shown.

In the event that a fixed multiplier amount is to be entered into the machine and kept there for a great number of computations without there being a reset of the MP counter the switch 395 can be thrown from closed full line position to open position. This is the position for so-called constant multiplier operations. With such constant multiplier operations, switches 391 and 396 would also be thrown to the same position which they assumed for rate card operations. On constant multiplier operations, switches 405 and 401 (Fig. 20e) can be positioned as desired in ordinary rate card operations.

*Half cent pickup*

In multiplying operations where decimal amounts are involved it is sometimes desirable to punch the product to the nearest half cent, for example if the product came out 486.4, the 4/10ths should be disregarded in punching out the product. On the other hand if the product came out 484.6 the amount to be punched would be 487. An improved one-half cent pickup control is provided for in the present machine which will now be described.

To obtain the one-half cent pickup the RH accumulator is utilized and provision is made for introducing an extra increment of movement to the accumulator wheel of the lowest order from which a product amount is to be read out provided the wheel of the RH accumulator to the right of such wheel is at the five position or in any greater position. Where one-half cent pickup is provided, provision is made for adding a 5 into the wheel to the right during the cycle of the machine preceding the entry of amounts into the RH accumulator. With such extra 5 added into the wheel if the computed amount in such wheel is less than 5 there would be no carryover to the next higher order wheel, but if it is greater than 5 there will be a carryover and accordingly on reading out the product the amount punched will be to the nearest one-half cent. For one-half cent pickup purposes a plug socket 413 is provided (see Fig. 20a) and cam contacts FC—1 are timed to close at the 5 index point position in the cycle of the machine and such contacts close during the card feed cycle of the machine. Plug sockets 414 are also provided associated with the various magnets 390RH (Fig. 20c) pertaining to the RH accumulator and where a one-half cent pickup is desired a plug connection is made from plug socket 413 to the selected order socket 414 to cause an entry of 5 into this selected order. The plug connection, it will be understood, will be made to the socket 414 in the column to the right of the first column to be punched. With one-half cent pickup operations, the elimination of punching of certain product columns is obtained according to the placing of plugs at the plug board 400 (Fig. 20d). The one-half cent entry circuit to cam contacts FC—1 is through relay contacts H—1 and relay contacts H—1 are shifted to supply current to FC—1 upon energization of the relay coil H in the manner previously explained.

*Fixed multiplier operations*

In some cases it may be desirable to retain a fixed multiplier in the machine and multiply all detail cards by such fixed multiplier. Under these conditions all the switches which are manipulated for rate card operation are thrown to the position for such rate card operation with the exception of switch 395 which is thrown to open position. The fixed multiplier can be introduced in the machine from a rate card which is specially punched at the X position. The passage of this card through the machine will set up the fixed multiplier amount in the multiplier receiving device and such receiving device will never be reset until the 395 switch is reclosed, which may be after the run of the entire group of cards through the machine. After a fixed multiplier operation of the type just described, provision is made to reset the multiplier receiving device before another card run is started. To effect such reset, switch 395 is thrown to closed position and switch 396 is thrown to closed position. The reset circuit for the 392MP reset magnet is then provided through relay contacts H—I (Fig. 20a) which are now in the position shown, through cam contacts FC—9 now closed, through the 392MP reset magnet and back to ground through switch 396. As soon as cards of the following run pass into the machine H—I becomes shifted to interrupt the above mentioned special reset circuit.

*Multiplier and/or multiplicand class selection*

In certain kinds of computing work it may be desirable to have two multiplier factor amounts perforated on a card and have the machine operate to optionally select which of these multiplier amounts are to be used in a multiplying computation according to a special X punching on such card. Likewise it may be desirable to have two multiplicand amounts on a card and select one or the other of the multiplicand amounts for use in a computation according to a special X punching on such card. A special control is provided in the present machine for such purpose. A use of such an arrangement might be in computations involving, for example, wholesale and retail prices. One use of such an arrangement would be in computations where certain special cards require different multiplier and multiplicand factors. For example, there might be computations involving wholesale and retail prices and the general run of cards would involve a wholesale price computation and special cards in the run might involve a retail price computation. Such cards comprising the special card in the retail price computation could be computed without resorting and separately computing such cards and such special price cards can be maintained in the regular card run.

Referring to the circuit diagram (Fig. 20e) a special X control circuit is provided designated 416. There is a switch 417 in this circuit and the circuit extends to a special X brush 106a which is in alignment with the usual X brush, but in a different columnar position. From the special brush 106a the circuit extends to a relay coil T and stick contacts T—1 are provided for this relay coil T which connect back to the left of the FC—3 contacts.

Referring to Fig. 20a the energization of relay coil T is adapted to shift the center blade of three-blade contacts generally designated 418 from the position shown to the right hand position and provide an alternative entry circuit from plug sockets 419 to either of plug sockets 420 or 421. With two multipliers to be optionally entered certain multiplier brush entry circuits would be connected to the 420 sockets and other multiplier brush entry circuits to 421 sockets and for the optional entry of multiplicand amounts certain multiplier entry circuits from the 109MC brushes would be connected to the 420 sockets and others to the 421 sockets. Upon the passage of a card which is specially X punched so that the special circuit is established through brush 106a (Fig. 20e) and with switch 417 closed, there would be a shift of the entry circuits from one set of brushes to another set of brushes. The timing is such that this shift occurs prior to the reading in of the factor data entries from the card and the shift is retained during the time in the cycle of operation of the machine during which the entry is made from the card into the MP and/or MC counters.

It will be understood that relay coil T becomes energized upon the passage of a card past the special X brush position since relay contacts H—2 are closed at this time under the control of the card lever 112 and also that cam contacts FC—5 are closed at this time.

*Bill printing*

Previous explanation has been made of the mechanical details of the bill printing arrangement shown in Figs. 1b, 8 and 9. This bill printing arrangement is arranged for the printing of bills with the amount of the multiplier, the amount of the multiplicand and the amount of the product.

In the operation of the bill printing mechanism, printing of the amount of the multiplier and of the amount of the multiplicand occurs as a preliminary printing operation and this is followed at a later time in the cycle of operation of the multiplying machine proper by the printing of the product.

It will be understood that the bill printing mechanism is an adjunct to the multiplier and it need not be used unless bills are desired to be printed. With normal simple multiplying operations without bill printing, switch 422 (Fig. 20e) would be left in open position. With bill printing operations switch 422 would be thrown to closed position and with bills in the magazine of the bill printer the operation would be as follows. With the multiplying machine started up in operation and cards being fed in the card handling section of the multiplying machine, relay coil G (Fig. 20e) becomes energized in the manner previously described and such relay remains energized so long as cards are in the feed section of the multiplying machine. With switch 422 closed and relay coil G energized, relay contacts G—3 are closed and with cam contacts FC—13 closed at the time shown in the timing diagram a circuit is established to the feed clutch magnet 423 of the bill printing mechanism (see also Fig. 1b). With 423 energized a bill is fed by the bill printing attachment to the printing position thereby and after the bill is fed to such printing position it remains at such printing position until all printing is completed. Cam contacts FC—13 after being closed, reopen to prevent a further bill feed until the card feed cycle of the multiplying machine pertaining to a new computation is initiated. By the time the bill has reached the printing position in the bill printer the multiplicand and multiplier factors will have been entered into the multiplier and multiplicand receiving devices of the multiplying machine and the amounts of the multiplicand and the amounts of the multiplier will have been set up on the MCRO—2 readout and the MPRO—2 readout device of the multiplying machine. At the time shown on the timing diagram (Fig. 21a), cam contacts FC—14 close. With such cam contacts closed and with relay contacts F—4 closed by the energization of coil F in the manner previously explained, a circuit will be established to energize the multi-contact relay coil 2—CR and at the proper time in the cycle of operation of the machine contacts 2—CR—1 to 16 (Fig. 20d) become closed. With these contacts closed and with the emitter 268 in action, relay coil D being now de-energized and with contacts D—1 in the position shown, impulses will be emitted through the MCRO—2 readout, the MPRO—2 readout through the 2—CR—1 to 16 contacts, via plug connections at plug board 425 to the 112 bill printer selector magnets which pertain to the multiplicand and the multiplier. Concurrently with the emission of impulses through the MCRO—2 and MPRO—2 readout devices, the type carriers 157 of the bill printer move forward, this action being provided by the energization of the print clutch magnet 424 of the bill printer (see Fig. 1b and Fig. 20e.) This print clutch magnet circuit is established in the following manner. Through relay contacts F—3, cam contacts FC—12, printing clutch magnet 424 to the other side of the line. The type carriers 157 are carried forward concurrently with the emission of impulses by the 268 emitter and such type carriers as pertain to the multiplicand and multiplier are selectively arrested by the energization of the related 172 printing control magnets. Following the arresting of the multiplicand and multiplier type carriers at the printing position, a printing impression is taken. During the time when the printing impression is taken from the multiplicand and multiplier type carriers, the product representing type bars will have moved to a full extent to the left to a position beyond the zero printing position and consequently no impression will be taken from the product type bars at this time.

The bill has now received a printing of the amount of the multiplier and the multiplicand and the multiplying machine proceeds with its usual computing operation. When the amount of the final product is being read out from the final products accumulator into the summary products accumulator, relay coil D (Fig. 20e) is energized, shifting relay contacts D—1 to supply current to emitter 267. Plug connections from the double sockets of the upper section of plug board 400 (Fig. 20d) extend to plug sockets 426 which are connected to one side of the 3—CR—1 to 10 contacts. Another plug board 427 is provided at which plug connections may be made from the other side of these 3—CR—1 to 10 contacts to the print selector magnets 172 which are to be used for printing of the products. At the time when relay coil D is energized, relay contacts D—3 (Fig. 20e) become closed and upon closure of cam contacts CC—4 the printing clutch magnet 424 is energized to bring about a movement of the printing type carriers as before. The energization of relay coil D also closes relay contacts D—4 (Fig. 20e) and upon closure of cam contacts CC—5 the multi-contact relay coil 3—CR will become energized allowing closure of contacts 3—CR—1 to 10 (Fig. 20d) and permitting the energization of the print selector magnets 172 pertaining to the product. The printing type bars 157 pertaining to the product are then arested at the printing position and after this there is the usual striking and printing impression taken which prints the product upon the bill. While the multiplicand and multiplier type bars move forward during this product printing operation they move to a position beyond the zero printing line so that there is no re-printing of figures in the multiplicand and multiplier fields at the time when product printing is being effected.

The bill pertaining to the first transaction has now been completely printed and upon the following computing operation in the multiplying machine upon the next card the operations are repeated on a new bill and the previously printed bill is fed out to the discharge stack 153.

When cards become exhausted from the supply magazine of the machine, during the last card feed cycle which is an idle and extra cycle, card lever contacts 112 (Fig. 20e) open. During this same cycle when cam contacts FC—2 open, relay coils G and H become de-energized. The de-energization of relay coil G allows the G—1 contacts to shift to the position shown. With cards running out of the machine, the card lever contacts 120 in the punch also do not reclose. Accordingly relay coil F becomes de-energized and the de-energization of relay coil F causes the opening of contacts F—2 (Fig. 20a) so that there is no reset of the LH accumulator and with no reset of the LH accumulator there is no re-initiation of a card handling cycle. This stops the operation of the machine.

Previous reference has been made to relay coil N (Fig. 20a) and of relay contacts N—1 (Fig. 20e). Such relay coil N with its contacts N—1 is provided in order to prevent extra card feed cycles at the time the machine is running out of cards in the event that the start key is held depressed. If relay coil N be energized, the relay contacts N—1 (Fig. 20e) will be open and such open contacts interrupt the circuit to the card feed clutch magnets 384 under these conditions.

When bill printing operations are being performed the last bill is carried out of the machine by the depression of a supplementary key 432 (see Fig. 20e), which when closed energizes bill feed clutch magnet 423. It may also be mentioned that the machine is adapted to print bills upon rate card operations as well as upon normal multiplying operations. However, upon rate card operations an extra bill will be printed for the rate card, which bill will have printed thereon the actual amount of the multiplier. The multiplicand and product being zero on the rate card such amounts will be printed as zeros upon this extra bill.

In the use of machines of this class occasion some times arises when it is desired to utilize the machine as a simple tabulating machine and to enter and add amounts direct from the records into a selected counter or counters of the machine. The machine may thus be used for simple adding tabulating operations. Such adding tabulating operations are also useful for test purposes to facilitate the checking of circuits and the operating time of various counters and other parts of the machine. When the machine is to be used in this manner, certain switches are manipulated so that the cards are passed through the card handling section of the machine and the amounts read therefrom and entered into a certain device or devices. The machine operating in this manner passes the cards one by one through the punch without punching the cards and delivers them to the discharge magazine of the punch. In this kind of an operation all cycle controlling and multiplying and resetting operations are suppressed during such runs. For this purpose supplemental switches 266 (Fig. 20a) and 266a (Fig. 20e) are provided.

Suitable plug connections of the usual sort can be used to plug directly from the 109 brushes directly to the MC magnets, the MP magnets, the RH magnets, the LH magnets and the summary products mangnets. On the LH accumulator supplemental plug sockets 431 are provided for this purpose (see Fig. 20c).

Before setting the machine in operation for simple adding, the operator opens switches 266 and 395 (Fig. 20a), sets switch 401 to the 404 position and closes switch 266a (Fig. 20e). The machine is then set in operation in the usual way and in running with this sort of a control the open switch 266 prevents any reset of the LH accumulator. Inasmuch as the LH accumulator is not and cannot be reset with this type of running, the cycle controller is not set up so that there is accordingly no reset of the MC accumulator, nor of the MP accumulator because of switch 395 being open. There is furthermore no reset of the RH and LH accumulators.

By having switch 266a closed, coil C is maintained energized at all times. Accordingly, relay contacts C—1 remain closed at all times. With contacts N—1 closed, which is their normal position and with contacts P—1 closed and relay contacts F—1 closed there will be an energization of card feed clutch magnet 384 when cam contacts FC—6 close.

By the above circuit, provision is made for initiating a succession of card feeding cycles to provide for the adding up of amounts from the series of cards passing through the machine.

The operator runs the machine until the desired number of cards have been run through and the amounts added up on the desired counter or counters.

It will now be appreciated that after performing simple adding operations, the machine can be readily reset as follows: The various switches, plug connections, etc., are restored to their proper positions for normal multiplying operation, and a blank or "dummy" card is placed in the card magazine 105, and the start key is depressed. The machine will then handle this card and perform multiplying operations with the amount standing in the MP and MC accumulators, as will be readily understood,—a product amount being obtained and punched back on the card. The blank card, so punched, is presumably of no consequence and can be discarded. In the course of this operation, the amounts standing on the MP, MC, RH and LH accumulators will be cleared in the manner fully explained hereinabove relative to regular multiplying operations. The summary products accumulator is reset by depressing the manual SP reset key 410, Fig. 20a, in the usual fashion. All accumulators are now cleared of amounts derived from the simple adding operations, and normal multiplying operations can be continued, as desired. Any amount left standing in the LH accumulator, as a result of the above described "dummy" multiplying operation, will of course be cleared during the early stages of a succeeding multiplying operation (which may occur when the machine is put into operation with regularly punched cards for any desired multiplying purposes).

Certain features of the present invention, relating to the card feed and analyzing portion of the present machine, form the subject matter of my copending divisional application, Serial No. 28,850, filed June 28, 1935.

What I claim is:

1. A record controlled accounting multiplying machine including a final product receiving device, and a cycle controller, means for effecting reset of the final product receiving device, and means controlled by the reset of the final product receiving device for setting up the cycle controller for controlling a new computing operation.

2. The invention set forth in claim 1 in which a supplementary control for the reset of the final product receiving device is provided to prevent the possibility of double resetting operations and for preventing undesired double initiations of multiplying operations.

3. A record controlled and record making multiplying accounting machine controlled for multiplying operations by data derived from records and with means for effecting recording of product data upon the record from which the factor data was derived, said machine including a final product receiver and a resettable entry receiving device, a bill printing device for printing bills and means for controlling said bill printing device from the final product receiver of the multiplying machine, common control means controlled by the reset of the resettable entry receiving device for rendering effective said last mentioned means and for controlling initiation of operation of the bill printing device.

4. A multiplying accounting machine including an accumulator for left hand components of partial products, an accumulator for right hand components of partial products, transfer lines intermediate the accumulators for transferring the accumulation in one accumulator into the other accumulator multiplying relays having contacts for controlling the flow of partial products representing impulses into the two accumulators and a common emitter for creating the impulses and supplying them to the contacts of the said relays and to the transfer lines intermediate the accumulators.

5. A multiplying accounting machine with a multiplier entry receiving device, a multiplicand entry receiving device and a cycle controller with a sequence circuit, reset control magnets in said sequence circuit for both of the aforesaid entry receiving devices, and means for concurrently energizing both of said magnets directly by and upon the establishing of the sequence circuit of the cycle controller.

6. A multiplying accounting machine including a cycle controller adapted to be set up and maintained set up, a multiplicand entry receiving device, means for resetting the same, and means effective upon the reset of the multiplicand entry receiving device for breaking down the set up of the cycle controller.

7. The invention set forth in claim 6 in which the cycle controller has a sequence circuit and in which the means for resetting the multiplicand entry receiving device includes a control magnet means disposed in such sequence circuit which magnet means is energized upon establishment of the sequence circuit to immediately initiate reset.

8. A multiplying accounting machine with card feeding devices, a multiplicand entry receiving device and a cycle controller, means controlled by the cycle controller for directly initiating a reset of the multiplicand entry receiving device, means effective upon such reset and under reset control for initiating a new card feeding action and means effective upon such reset and under reset control for bringing about a break down of the previous set up of the cycle controller.

9. A record controlled accounting machine with card handling devices, punching devices and multiplying devices with product receiving means, means for initiating the effecting of card feeding operations by the card handling devices, and means controlled by said card handling means for initiating punching operations by the punching devices under control of the product receiving means of the multiplying devices.

10. A record controlled multiplying accounting machine with record sensing means for factor data, factor entry receiving means receiving from records the amount of one factor of a to be performed computation, and entry receiving means for receiving another factor of the to be performed computation, multiplying means controlled by both said factor entry receiving means for effecting multiplication of factors entered therein, and record controlled means for selectively controlling the entry of one amount or another amount from the sensing means sensing the same record into the first mentioned factor entry receiving means whereby one or another of said amounts may comprise one of the factors multiplied by the multiplying means under record card control.

11. A record controlled multiplying accounting machine with record sensing means for sensing factor data upon records a multiplicand entry receiving device receiving the amount of one factor from records, a multiplier entry receiving device receiving the amount of another factor from records, multiplying means controlled by said entry receiving devices for effecting multiplication of factors entered therein, record controlled means for selectively controlling entry of one amount or another amount from the sensing means sensing the same record into one of the said entry receiving devices whereby one or another of said amounts may comprise one of the factors multipled by the multiplying means, means for selectively associating the sensing means, the aforesaid selecting means, the multiplicand entry receiving device and the multiplier entry receiving device so that one of a plurality of multiplicand amounts or one of a plurality of multiplier amounts can be utilized in multiplying computations under record card control.

12. In an accounting machine with multiplying devices, multiplier and multiplicand entry receiving means for controlling multiplying, punching means for punching results obtained by the multiplying devices, control means from which multiplier and multiplicand entries may be derived; the combination with the entry receiving means and entry controlling means of a switching means positionable by a single operation to reverse the receiving relationship of the receiving means with respect to the control means so that a previous multiplier becomes the multiplicand and the previous multiplicand becomes the multiplier for check runs, said switching means containing means for suppressing punching by the punching means on check runs, and a cooperating switch to permit punching on check runs irrespective of the status of the last mentioned switch and adaptable also in another position to suppress such punching.

13. A record controlled and record making multiplying accounting machine controlled for multiplying operations by data derived from records and with means for effecting recording of the product upon the record from which the factor data was derived, said machine including a final product receiver and multiplier and multiplicand receiving devices, a bill printing device for printing bills, means for controlling said bill printing device from the final product receiver of the multiplying machine, means also for controlling the bill printing device from the multiplicand and multiplier receiving devices, and successively acting control means to cause successive recording operations with the multiplier and multiplicand being first printed upon a bill and the product subsequently printed upon the same bill.

14. In a multiplying accounting machine which senses data from records, multiply such data and records the results upon the record from which factor data is derived having a final products receiver and multiplier and multiplicand receiving devices and including in combination a bill printer which is controlled for printing bills by the final product receiver and also by the multiplier and multiplicand receiving devices, control means to cause one bill to be fed by the bill printer for each multiplying computation, and control means to cause two successive printing operations to be effected for each bill which is fed so that the multiplier and multiplicand amounts can be printed on the same bill with the product and at different times as determined by the sequence of operation of the multiplying machine.

15. In a record controlled multiplying machine having means for sensing factor data representations upon records, means receiving such data and multiplying means for multiplying the received data, the combination with the sensing means of supplemental sensing means whereby more than one amount each pertaining to the same factor may be optionally derived from a common record, selecting means to select which amount as sensed by the sensing means is to be entered into receiving means, and means called into action automatically upon the sensing of each record for causing such selection to be effected.

16. The invention set forth in claim 15 wherein the means for causing selections to be effected comprises a record controlled means controlled by record sensing means which senses each record for a selecting designation.

GEORGE F. DALY.

CERTIFICATE OF CORRECTION.

Patent No. 2,045,437.  June 23, 1936.

GEORGE F. DALY.

It is hereby certified that error appears in the printed specification of the above numbered patent rquiring correction as follows: Page 3, second column, line 25, before "cycle" insert the word machine; page 6, first column, line 57, for "itno" read into; same page, second column, line 20, for "pat" read pot; page 7, second column, line 68, after "four" insert machine; page 10, second column, line 8, for "ensues" read ensue; page 11, second column, line 54, for "points" read contacts; page 17, second column, line 24, claim 4, after "accumulator" insert a comma; and that the said Letters Patent should be read with these corrections therein that the same may conform to the record of the case in the Patent Office.

Signed and sealed this 3rd day of November, A. D. 1936.

Henry Van Arsdale
Acting Commissioner of Patents.

(Seal)